US012322885B2

(12) United States Patent
Hsu et al.

(10) Patent No.: US 12,322,885 B2
(45) Date of Patent: Jun. 3, 2025

(54) ANTENNA STRUCTURE AND WIRELESS COMMUNICATION DEVICE USING SAME

(71) Applicant: Chiun Mai Communication Systems, Inc., New Taipei (TW)

(72) Inventors: Cho-Kang Hsu, New Taipei (TW); Chih-Hung Lai, New Taipei (TW); Yun-Jian Chang, New Taipei (TW); Geng-Hong Liou, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 212 days.

(21) Appl. No.: 17/954,519

(22) Filed: Sep. 28, 2022

(65) Prior Publication Data

US 2023/0094721 A1 Mar. 30, 2023

Related U.S. Application Data

(60) Provisional application No. 63/249,137, filed on Sep. 28, 2021.

(51) Int. Cl.

*H01Q 9/42* (2006.01)
*H01Q 1/38* (2006.01)
*H01Q 21/28* (2006.01)

(52) U.S. Cl.

CPC .................................... *H01Q 9/42* (2013.01)

(58) Field of Classification Search

CPC .......... H01Q 1/243; H01Q 9/42; H01Q 21/28; H01Q 1/38; H01Q 1/2266; H01Q 1/44; H01Q 1/48

See application file for complete search history.

(56) References Cited

U.S. PATENT DOCUMENTS

2004/0058721 A1* 3/2004 Kanazawa ............. H01Q 1/244 455/90.3
2023/0086173 A1* 3/2023 Lee ...................... H04M 1/026 455/566

FOREIGN PATENT DOCUMENTS

CN 213845499 U 7/2021
TW 201814965 A 4/2018

* cited by examiner

*Primary Examiner* — Wei (Victor) Y Chan
(74) *Attorney, Agent, or Firm* — ScienBiziP, P.C.

(57) ABSTRACT

An antenna structure applied in a wireless communication device including a hinge, the antenna structure includes a feed portion, a first radiation portion, and at least one ground portion; an end of the first radiation portion is electrically connected to the feed portion, another end of the first radiation portion is spaced from the hinge with a gap; the antenna structure generates a radiation signal in at least one radiation frequency band when the feed portion feeds electrical current to the first radiation portion and the hinge couples the electrical current from the first radiation portion. A wireless communication device having the antenna structure is also provided.

18 Claims, 19 Drawing Sheets

ANTENNA STRUCTURE AND WIRELESS COMMUNICATION DEVICE USING SAME

CROSS-REFERENCE TO RELATED APPLICATIONS

This application claims priority to U.S. provisional Application No. 63/249,137 filed on Sep. 28, 2021, the contents of which are incorporated by reference herein.

FIELD

The subject matter herein generally relates to wireless communications and an antenna structure and a wireless communication device having same.

BACKGROUND

Antennas are for receiving and transmitting wireless signals at different frequencies. However, an antenna structure is complicated and occupies a large space in a wireless communication device, which makes miniaturization of the wireless communication device problematic. Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
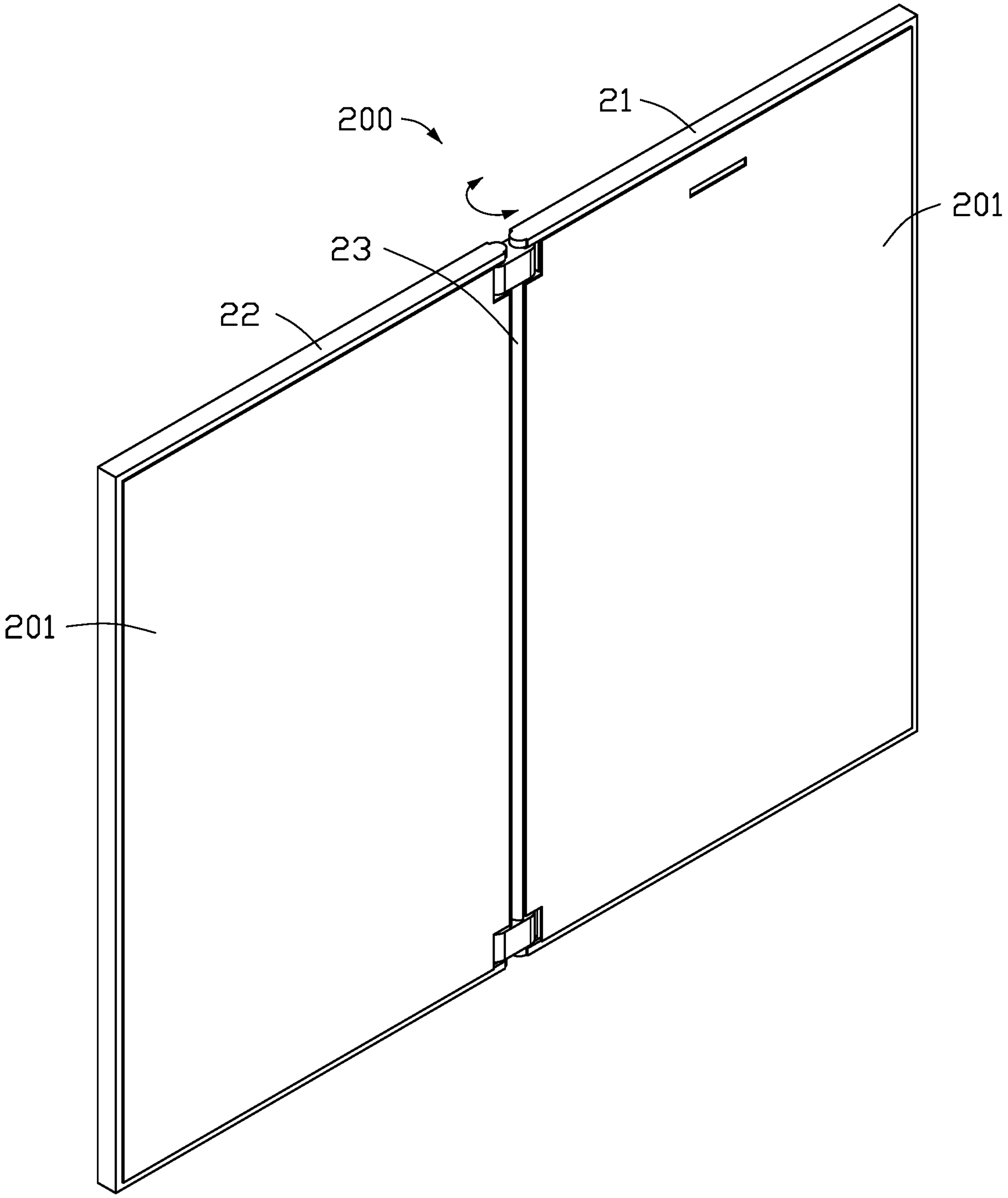
FIG. 1 is a schematic diagram of at least one embodiment of a wireless communication device in a first state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term “coupled” is defined as connected, whether directly or indirectly through intervening components, and is not necessarily limited to physical connections. The connection may be such that the objects are permanently connected or releasably connected. The term “substantially” is defined to be essentially conforming to the particular dimension, shape, or other feature that the term modifies, such that the component need not be exact. For example, “substantially cylindrical” means that the object resembles a cylinder, but may have one or more deviations from a true cylinder. The term “comprising,” when utilized, means “including, but not necessarily limited to”; it specifically indicates open-ended inclusion or membership in the so-described combination, group, series, and the like.

The present disclosure is described in relation to an antenna structure and a wireless communication device using the same.

Figure 4:
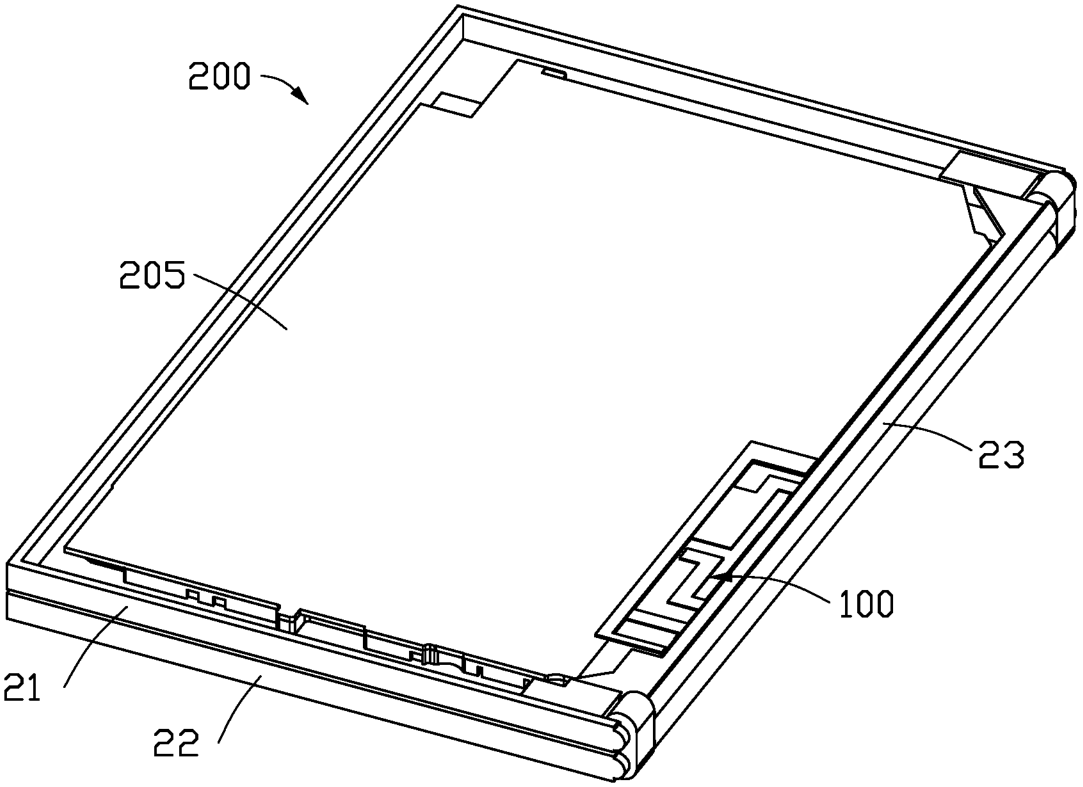
FIG. 4 is a schematic diagram of a first embodiment of an antenna structure applied in the wireless communication device.

FIG. 1 and FIG. 4 illustrate a first embodiment of a wireless communication device 200 using an antenna structure 100. The antenna structure 100 may be used in the wireless communication device 200, which may be for example, a mobile phone, a tablet computer, a personal digital assistant (PDA), a notebook computer, display device, an electrical player, a gaming device, a television, a wearable device, an internet of things (IOT) device, and/or an automobile. The antenna structure 100 may transmit and receive radio waves and exchange wireless signals.

The wireless communication device 200 can function in any of the following communication technologies: BLUETOOTH (BT) communication technology, global positioning system (GPS) communication technology, wireless fidelity (WI-FI) communication technology, global system for mobile communication (GSM) technology, wideband code division multiple access (WCDMA) communication technology, long term evolution (LTE) communication technology, 5G communication technology, SUB-6G communication technology, and any other future communication technologies.

Figure 2:
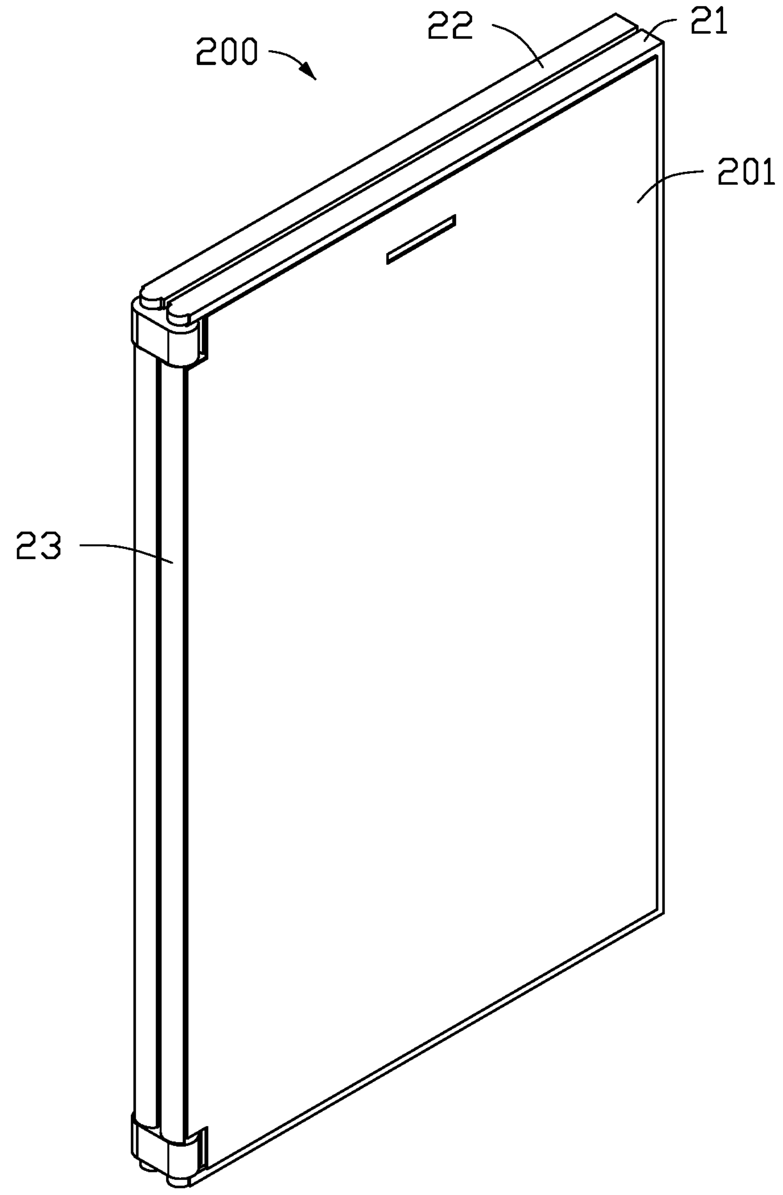
FIG. 2 is a schematic diagram of at least one embodiment of a wireless communication device in a second state.
Figure 3:
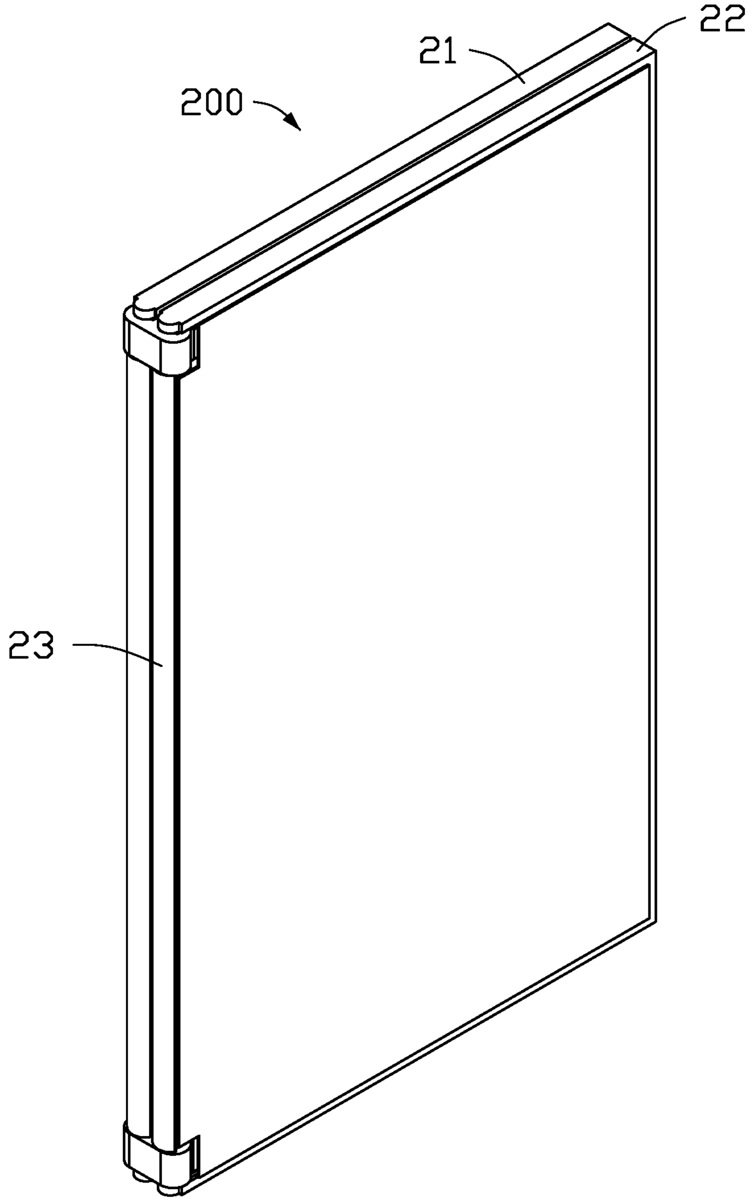
FIG. 3 is a schematic diagram of at least one embodiment of a wireless communication device in a third state.

Referring to FIGS. 1, 2, and 3, the wireless communication device 200 includes a first housing 21, a second housing 22, and a connected piece 23. The first housing 21 and the second housing 22 are connected through the connecting piece 23 and each housing can rotate in relation to the other.

The first housing 21 is substantially a hollow rectangular structure and forms a receiving space (not shown) for receiving the antenna structure 100 and other electronic components. The first housing 21 may be made of metal or other conductive material. The first housing 21 may define an opening (not labeled in the figures) on a side. In at least one embodiment, the second housing 22 has a structure similar to that of the first housing 21. Thus, detail of the structure of the first housing 21 only is described.

The wireless communication device 200 further includes two display units 201, one display in each opening, of the first housing 21 and the second housing 22, so as to form a double-screen structure. The display unit 201 has a display plane, and the display plane is exposed through the opening. In at least one embodiment, the display unit 201 may be a touch display combining a touch sensor. The touch sensor in the display may be a touch panel or a touch sensitive panel.

In at least one embodiment, the display unit 201 has a high screen-to-body ratio. That is, an area of the display plane of the display unit 201 is greater than 70% of a frontal area of the wireless communication device 200, and even a front full screen may be achieved. In at least one embodiment, a full screen may be achieved with a slot other than the necessary slot defined in the antenna structure 100, and the left, the right, and the lower sides of the display unit 201 may be connected to the first housing 21 or the second housing 22 seamlessly. The first housing 21 and the second housing 22 are used to support the display unit 201, provide electromagnetic shielding, and improve the mechanical strength of the wireless communication device 200.

In at least one embodiment, the connecting piece 23 may be a hinge, which may be made of metal or other conductive materials. The first housing 21 and the second housing 22 are connected to opposite sides of the connecting piece 23, and may rotate relative to the connecting piece 23 to form different status. In details, referring to FIG. 1, the first housing 21 and the second housing 22 are in an open and unfolded status relative to the connecting piece 23, that is, the first housing 21, the connecting piece 23, and the second housing 22 are connected in order. At this time, the wireless communication device 200 may be in a tablet mode, the two display units 201 are positioned on a same side of the wireless communication device 200, the images of the two display units 201 may be spliced to form a single display with greater size, for displaying user interface or content with greater size, so as to provide better browsing effect for the user.

Referring to FIG. 2, the first housing 21 and the second housing 22 can rotate to a folded or overlapped status in a first direction relating to the connecting piece 23 as a rotating axis. That is, the first housing 21 and the second housing 22 are positioned on a same side of the connecting piece 23 and overlapped. At this time, the wireless communication device 200 may be in a phone mode, the two display units 201 are positioned back-to-back on opposite sides of the wireless communication device 200 (that is the two display units 201 are opposite and facing outwardly), the two display units 201 may display a same or different user interface or content, and provide different views for the user. In at least one embodiment, when the wireless communication device 200 is in the phone mode, one of the display units 201 may be a main display, the other one of the display units 201 may be a deputy display.

Referring to FIG. 3, the first housing 21 and the second housing 22 can each rotate through 180 degrees to an overlapped status in a second direction relating to the connecting piece 23 as a rotating axis, that is, the first housing 21 and the second housing 22 are positioned on a same side of the connecting piece 23 and again folded and overlapped. At this time, the wireless communication device 200 may be in a standby mode, the two display units 201 are positioned face-to-face on a side of the wireless communication device 200 (that is the two display units 201 are facing to each other), the two display units 201 may be hidden and protected.

In at least one embodiment, the first direction is opposite to the second direction.

In another embodiment, the first housing 21 and the second housing 22 may be formed by connected frames (not shown) and a backboard (not shown). The frames and the backboard may cooperatively enclose the receiving space (not shown).

Referring to FIG. 4, the wireless communication device 200 may further include a circuit board 205 received in the first housing 21. In at least one embodiment, the circuit board 205 may be configured to provide a feed electrical current and ground for the antenna structure 100. In other embodiments, the circuit board 205 may further include other electronic components for executing a main circuit and system functions of the wireless communication device 200. The circuit board 205 may further include a system ground plane for grounding the antenna structure 100.

In other embodiments, the wireless communication device 200 may further include one or more electronic elements, such as a processor, a circuit board, a storage, a power assembly, an input/output circuit, an audio assembly (such as a microphone and/or a speaker), a multi-media assembly (such as a front camera and/or a rear camera), and a sensor assembly (such as a proximity sensor, a range sensor, an ambient light sensor, an acceleration sensor, a gyroscope, a magnetic sensor, a pressure sensor, and/or a temperature sensor), etc.

Figure 5:
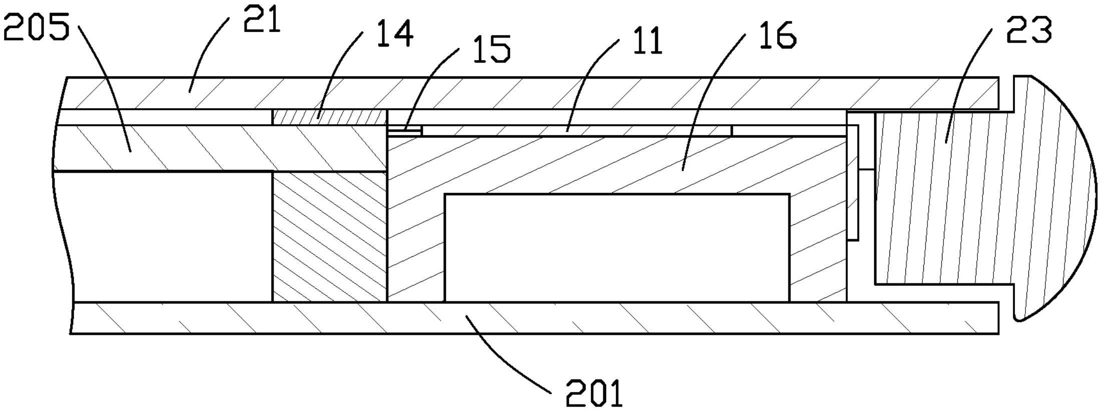
FIG. 5 is a cross-sectional view of the wireless communication device of FIG. 4.
Figure 6:
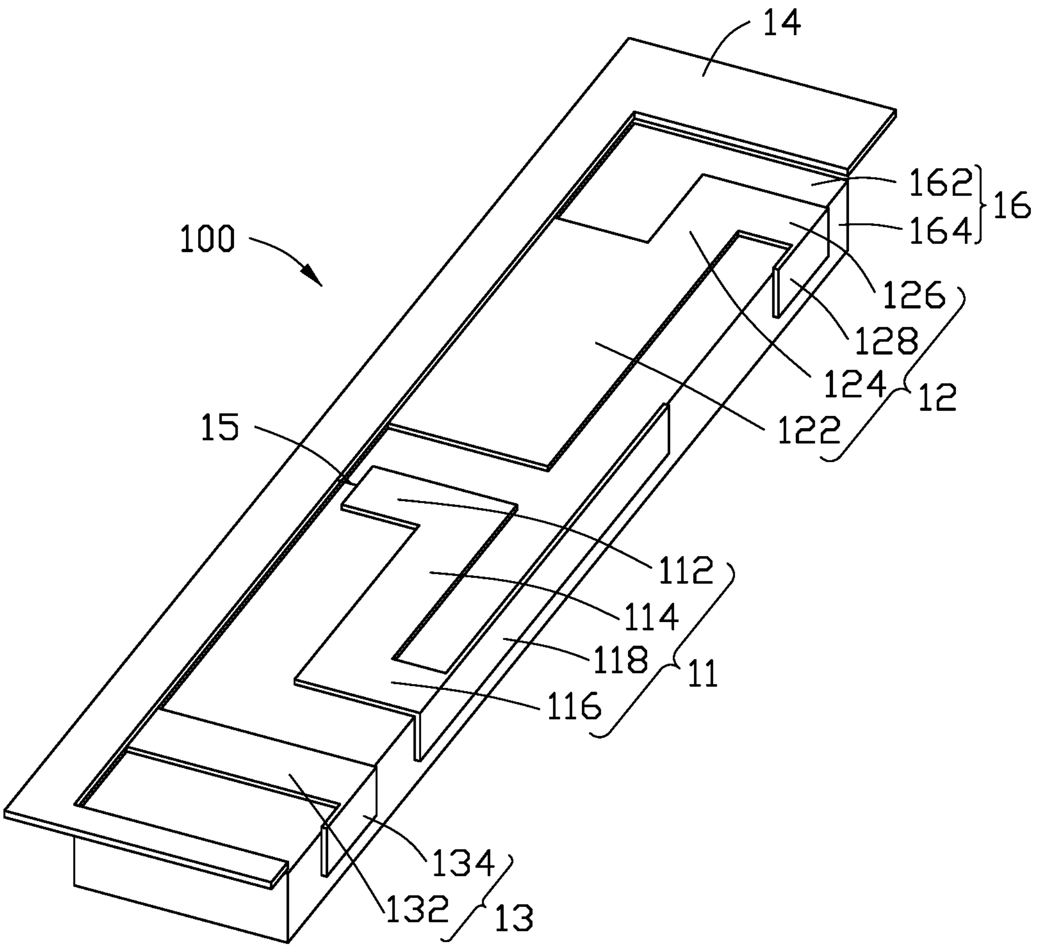
FIG. 6 is a schematic diagram of the antenna structure of FIG. 4.
Figure 7:
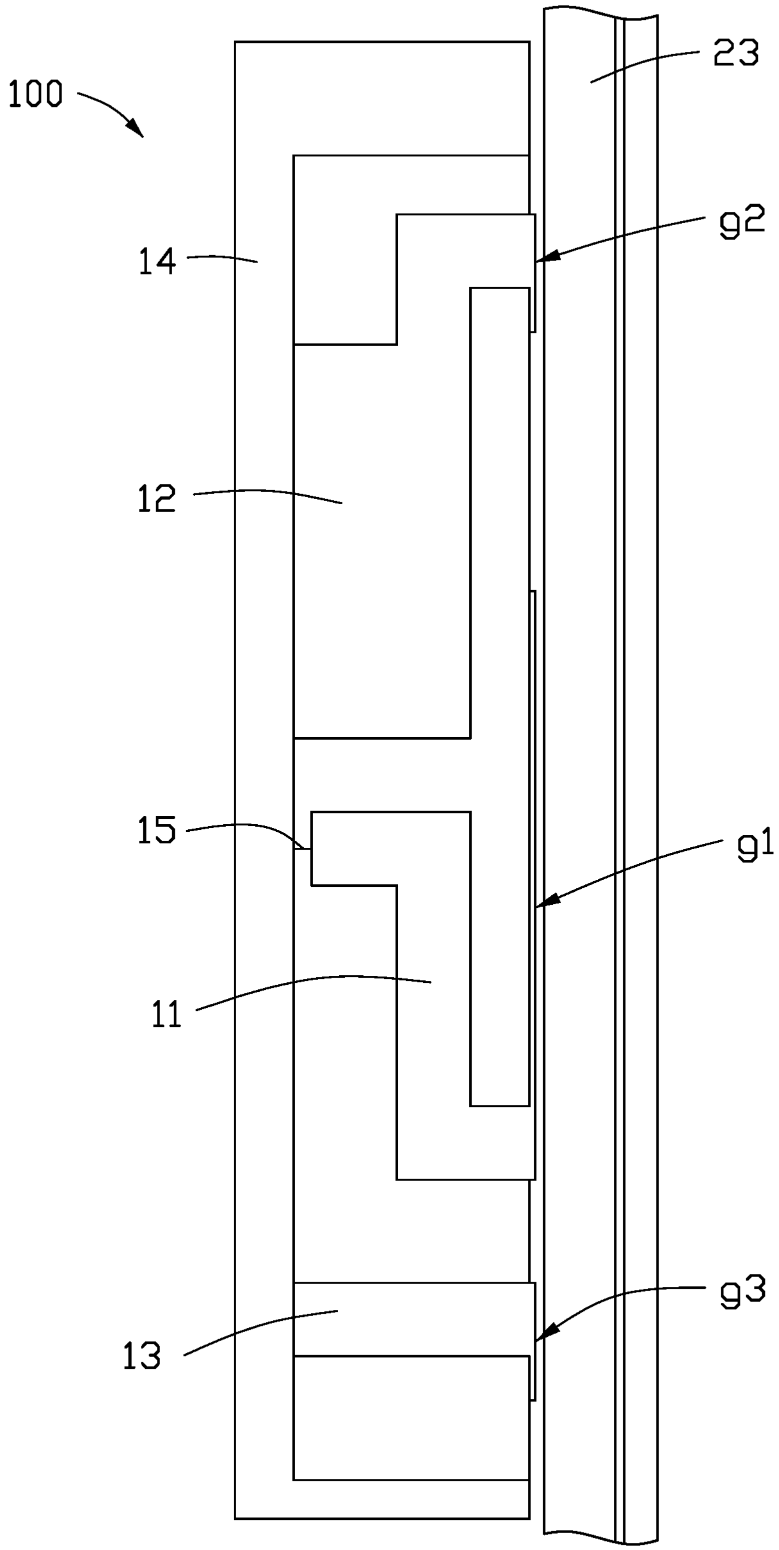
FIG. 7 is another schematic diagram of the antenna structure of FIG. 4.

Referring to FIGS. 5, 6, and 7, the antenna structure 100 may be received in the first housing 21. The antenna structure 100 at least includes a first radiation portion 11, a second radiation portion 12, a third radiation portion 13, a metal piece 14, a feed portion 15, and a carrier 16.

The first radiation portion 11, the second radiation portion 12, and the third radiation portion 13 are arranged at intervals and supported on the carrier 16. The second radiation portion 12 and the third radiation portion 13 are arranged on opposite sides of the first radiation portion 11. A side of each of the first radiation portion 11, the second radiation portion 12, and the third radiation portion 13 are spaced apart from the connecting piece 23.

In at least one embodiment, the carrier 16 at least includes a first plane 162 and a second plane 164. The first plane 162 is substantially perpendicular to the second plane 164. The second plane 164 is substantially parallel with and spaced apart from the connecting piece 23. The carrier 16 may be made of non-conductive material.

The first radiation portion 11 includes a first radiation section 112, a second radiation section 114, a third radiation section 116, and a fourth radiation section 118 connected in order. The first radiation section 112, the second radiation section 114, the third radiation section 116, and the fourth radiation section 118 are substantially in the form of strips. The first radiation section 112, the second radiation section 114, and the third radiation section 116 are positioned in a same plane and arranged on the first plane 162. The fourth radiation section 118 is positioned in another plane and arranged on the second plane 164. The first radiation section 112 and the third radiation section 116 are perpendicularly connected to two ends of the second radiation section 114 and extend in opposite directions. A free end of the first radiation section 112 may be electrically connected to a feed power source (or feed point) on the circuit board 205 through the feed portion 15 for feeding in electrical current. In at least one embodiment, the feed portion 15 may be electrically connected the first radiation section 112 and the feed power source (or feed point) on the circuit board 205 by means of an elastic sheet, a microstrip line, a strip line, or a coaxial cable. The fourth radiation section 118 is perpendicularly connected to an end of the third radiation section 116 which is away from the second radiation section 114, the fourth radiation section 118 is substantially parallel with the second radiation section 114, the fourth radiation section 118 and the second radiation section 114 extend in a same direction from two ends of the third radiation section 116. The fourth radiation section 118 is substantially parallel with and spaced apart from the connecting piece 23. In at least one embodiment, a gap g1 between the fourth radiation section 118 and the connecting piece 23 may be 0.3 millimeters. A length of the fourth radiation section 118 is greater than a length of the second radiation section 114.

The second radiation portion 12 includes a fifth radiation section 122, a sixth radiation section 124, a seventh radiation section 126, and an eighth radiation section 128 connected in order. The fifth radiation section 122 is substantially a sheet of material, the sixth radiation section 124, the seventh radiation section 126, and the eighth radiation section 128 are substantially strips of material. The fifth radiation section 122, the sixth radiation section 124, and the seventh radiation section 126 are positioned on a same plane and arranged on the first plane 162; the eighth radiation section 128 is positioned on another plane and arranged on the second plane 164. The fifth radiation section 122 and the seventh radiation section 126 are perpendicularly connected to two ends of the sixth radiation section 124 and extend in opposite directions. Another end of the fifth radiation section 122 is grounded (that is other end of the fifth radiation section 122 may be the grounded end), for grounding the antenna structure 100, and spaced apart from the metal piece 14. The eighth radiation section 128 is perpendicularly connected to an end of the seventh radiation section 126 that is away from the sixth radiation section 124, the eighth radiation section 128 is substantially parallel with the sixth radiation section 124, and the eighth radiation section 128 and the sixth radiation section 124 extend in a same direction from two ends of the seventh radiation section 126. The eighth radiation section 128 is substantially parallel with and spaced apart from the connecting piece 23. In at least one embodiment, there is a gap g2 between the eighth radiation section 128 and the connecting piece 23 which may be 0.3 millimeters wide. A length of the eighth radiation section 128 is less than a length of the sixth radiation section 124.

The third radiation portion 13 includes a ninth radiation section 132 and a tenth radiation section 134. The ninth radiation section 132 and the tenth radiation section 134 are substantially strips. The ninth radiation section 132 is positioned on a plane and arranged on the first plane 162; the tenth radiation section 134 is positioned on another plane and arranged on the second plane 164. An end of the ninth radiation section 132 that is away from the tenth radiation section 134 is grounded (that is the end of the ninth radiation section 132 that is away from the tenth radiation section 134 may be the grounded end), for grounding the antenna structure 100, and spaced apart from the metal piece 14. The tenth radiation section 134 is perpendicularly connected to the ninth radiation section 132. The tenth radiation section 134 is substantially parallel with and spaced apart from the connecting piece 23. In at least one embodiment, a gap g3 between the tenth radiation section 134 and the connecting piece 23 may be 0.3 millimeters wide. A length of the tenth radiation section 134 is less than a length of the ninth radiation section 132.

In at least one embodiment, the fifth radiation section 122 (the second radiation portion 12) and the ninth radiation section 132 (the third radiation portion 13) may be electrically connected to the first radiation section 112 and the system ground plane (or ground point) on the circuit board 205 by means of an elastic sheet, a microstrip line, a strip line, or a coaxial cable.

The metal piece 14 may be made of metal or other conductive materials. In at least one embodiment, the metal piece 14 is substantially U-shaped. The metal piece 14 surrounds the first radiation portion 11, the second radiation portion 12, and the third radiation portion 13, a side of the metal piece 14 defining an opening corresponds to the connecting piece 23. The metal piece 14, the connecting piece 23, and the display unit 201 cooperatively enclose a resonance chamber and also form a clearance area (not shown) therein. The first radiation portion 11, the second radiation portion 12, and the third radiation portion 13 are positioned in the resonance chamber or the clearance area.

In at least one embodiment, a size of the antenna structure 100 may be 45*8*3.5 in cubic millimeters ($mm^3$).

In at least one embodiment, the first radiation portion 11, the second radiation portion 12, the third radiation portion 13, the metal piece 14, and the connecting piece 23 may cooperatively form a couple hinge antenna (CHA).

In another embodiment, the second radiation portion 12 and the third radiation portion 13 may be electrically connected to the system ground plane through switch circuits, that is, grounded. In at least one embodiment, the switch circuits may be configured to switch the second radiation portion 12 and the third radiation portion 13 to the system ground plane, to disconnect the second radiation portion 12 and the third radiation portion 13 from ground, or to switch the second radiation portion 12 and the third radiation portion 13 to different ground locations (equivalent to switching to a component of different impedance), thereby effectively adjusting a bandwidth of the antenna structure 100, to achieve multi-frequency functions.

In at least one embodiment, the specific structure of the switch circuit may take various forms, for example, it may include a single switch, a multiple switch, a single switch with a matching component, or a multiple switch with a matching component.

In at least one embodiment, when the first radiation portion 11 supplies an electrical current from the feed point of the circuit board 205 through the feed portion 15, the electrical current will flow through the first radiation portion 11, and be coupled to the connected piece 23, the electrical current will further be coupled to the second radiation portion 12, the third radiation portion 13, and the metal piece 14, the electrical current is conducted in the metal piece 14, so the first radiation portion 11, the connecting piece 23, the metal piece 14, and the display unit 201 cooperatively form a chamber for metal resonance, to excite a first working mode and generate a radiation signal in a first radiation frequency band. In at least one embodiment, the first working mode includes a low frequency mode, a frequency of the first radiation frequency band includes a frequency band with a central frequency of 2480 MHz.

When the first radiation portion 11 supplies an electrical current from the feed point of the circuit board 205 through the feed portion 15, the electrical current will flow through the first radiation portion 11, and be coupled to the connected piece 23, the electrical current will further be coupled to the second radiation portion 12, the third radiation portion 13, and the metal piece 14, the electrical current is conducted in the metal piece 14, so the first radiation portion 11, the connecting piece 23, the metal piece 14, and the display unit 201 cooperatively form a metal resonance chamber structure, to excite a second working mode and generate a radiation signal in a second radiation frequency band. In at least one embodiment, the second working mode includes a frequency doubling of the low frequency mode, a frequency of the second radiation frequency band includes a frequency band with a central frequency of 5300 MHz.

When the first radiation portion 11 supplies an electrical current from the feed point of the circuit board 205 through the feed portion 15, the electrical current will flow through the first radiation portion 11, and be coupled to the connected piece 23, the electrical current will further be coupled to the second radiation portion 12 and the third radiation portion 13, so the first radiation portion 11, the connecting piece 23, and the display unit 201 cooperatively form a metal resonance chamber structure, to excite a third working mode and generate a radiation signal in a third radiation frequency band. In at least one embodiment, the third working mode includes a high frequency mode, a frequency of the third radiation frequency band includes a frequency band with a central frequency of 5800 MHz.

In at least one embodiment, the first working mode may cover WI-FI 2.4G mode, the first radiation frequency band may include a frequency band of 2400-2480 MHz. The second working mode and the third working mode may cover WI-FI 5G mode, the second radiation frequency band and the third radiation frequency band may include a frequency band of 5180-5800 MHz.

In at least one embodiment, the first radiation portion 11 supplies the electrical current through the feed portion 15, and couples the electrical current to the connected piece 23, the second radiation portion 12 and the third radiation portion 13, so as to form a multi-loop antenna.

In at least one embodiment, the feed portion 15 may be made of iron, copper foil, or other conductor, in a laser direct structuring (LDS) process.

In the wireless communication device 200, the optimized detuned antenna may have a greatest radiation efficiency at multiple frequency bands, detuning the characteristic of the antenna efficiency and shift frequencies of the antenna. Thus, in at least one embodiment, the feed portion 15 may be configured as inductor, capacitor, or their combination, that is, the feed portion 15 may be replaced by inductor, capacitor, or their combination. An end of the feed portion 15 is electrically connected to the system ground plane, that is grounded, other end of the feed portion 15 is electrically connected to the first radiation portion 11. Thereby the antenna structure 100 may have a high detuned efficiency and strong isolation.

Figure 8:
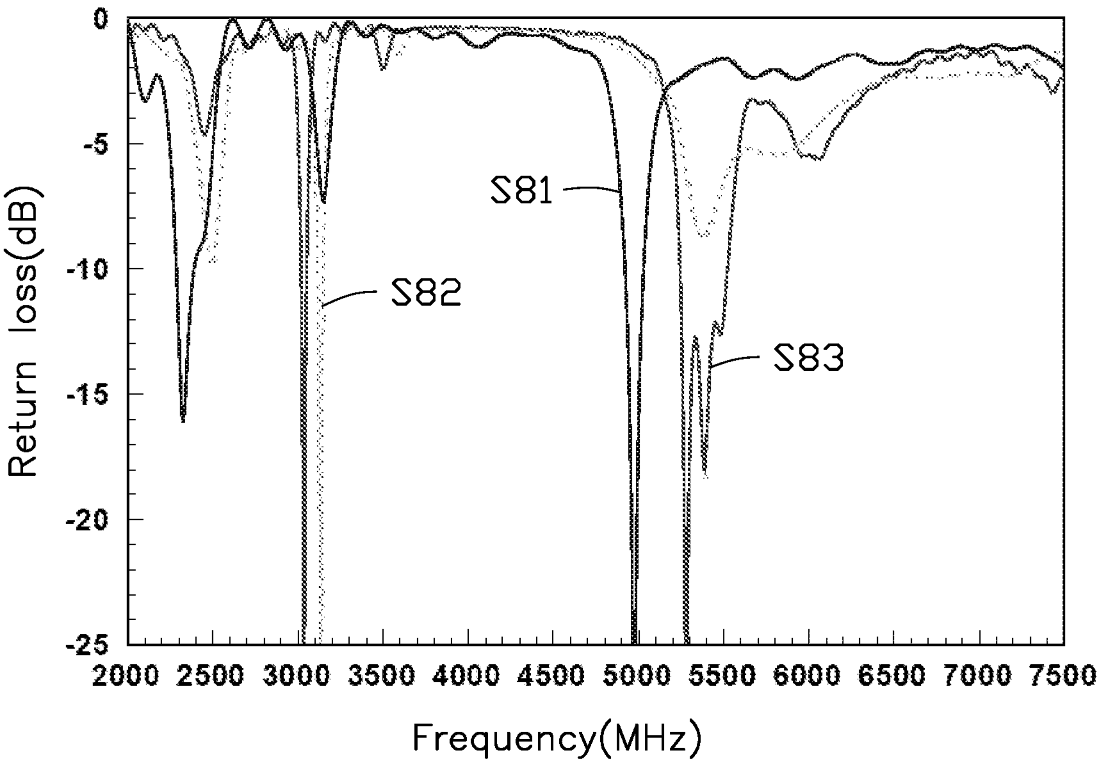
FIG. 8 is a return loss graph when the antenna structure of FIG. 4 is working.

FIG. 8 illustrates a graph of return loss of the antenna structure 100 when the wireless communication device 200 is in three modes (the tablet mode, the phone mode, and the standby mode). A curve S81 shows a return loss value of the antenna structure 100 when the wireless communication device 200 is in the phone mode. A curve S82 shows a return loss value of the antenna structure 100 when the wireless communication device 200 is in the tablet mode. A curve S83 shows a return loss value of the antenna structure 100 when the wireless communication device 200 is in the standby mode.

Figure 9:
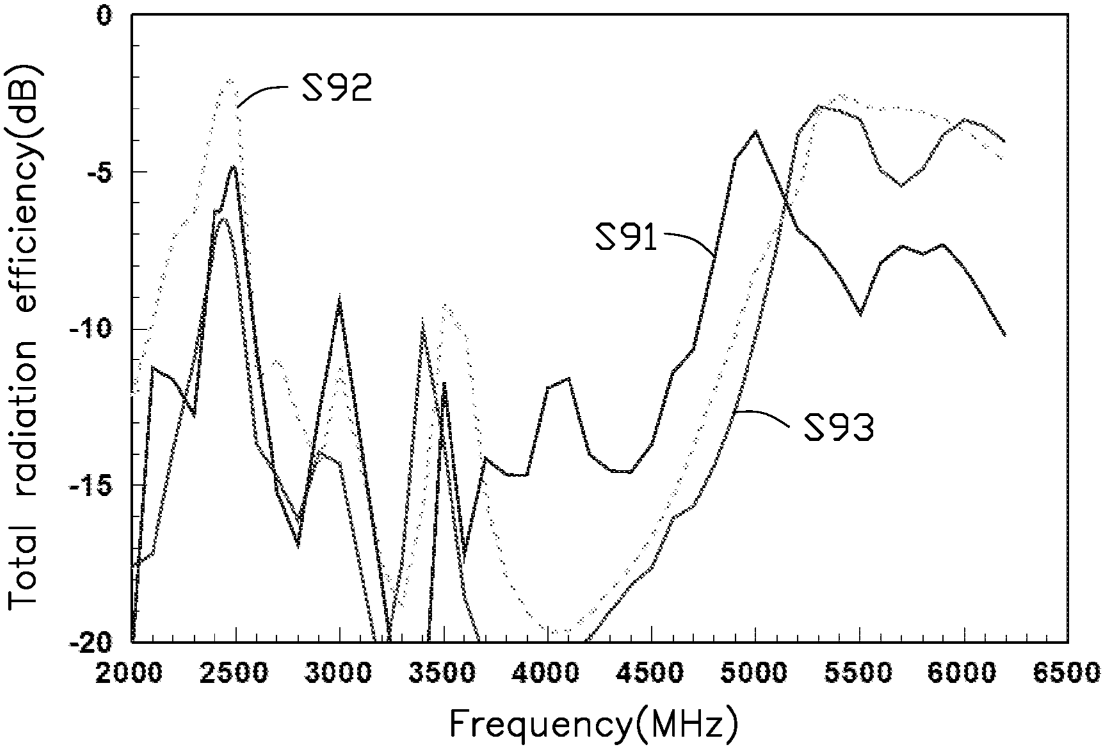
FIG. 9 is a total radiation efficiency graph when the antenna structure of FIG. 4 is working.

FIG. 9 illustrates a graph of total radiation efficiency of the antenna structure 100 when the wireless communication device 200 is in three modes (the tablet mode, the phone mode, and the standby mode). A curve S91 shows a total radiation efficiency of the antenna structure 100 when the wireless communication device 200 is in the phone mode. A curve S92 shows a total radiation efficiency of the antenna structure 100 when the wireless communication device 200 is in the tablet mode. A curve S93 shows a total radiation efficiency of the antenna structure 100 when the wireless communication device 200 is in the standby mode. In combination of efficiencies of the antenna structure 100 as shown in table 1, the antenna structure 100 may have a high radiation characteristic of −2.4~−7.9 dB at designed frequency band in different modes.

TABLE 1

| | antenna structure 100 | |
|---|---|---|
| | WI-FI 2.4G 2400-2480 MHz | WI-FI 5G 5180-5800 MHz |
| total radiation efficiency in the phone mode (dB) | −5.8 | −7.9 |
| total radiation efficiency in the tablet mode (dB) | −2.4 | −3.3 |
| total radiation efficiency in the standby mode (dB) | −6.8 | −4.1 |

FIGS. 8 and 9 show that the antenna structure 100 may cover frequency bands of WI-FI 2.4 GHz and WI-FI 5 GHz, improve a frequency width and antenna efficiency, and is beneficial to a carrier aggregation application (CA) of LTE-A. In other embodiments, the antenna structure 100 may be working at different working modes, such as the low frequency mode, the middle frequency mode, the high frequency mode, the ultra-middle frequency mode, the ultra-high frequency mode, 5G N78 mode, and the 5G N79 mode, and cover communication bands as commonly used in the world. In detail, the antenna structure 100 may cover GSM850/900/WCDMA Band5/Band8/Band13/Band17/Band20 at the low frequencies, GSM 1800/1900/WCDMA 2100 (1710-2170 MHz) at the middle frequencies, LTE-A Band7, Band 40, Band 41 (2300-2690 MHz) at the high frequencies, 1427-1518 MHz at the ultra-middle frequencies, 3400-3800 MHz at the ultra-high frequencies, and N78 (3300-3800 MHz), and N79 (4400-5000 MHz) at 5G frequencies range. The designed frequency bands of the antenna structure 100 may be applied to the operation of GSM Qual-band, UMTS Band I/II/V/VIII frequency bands, and LTE 850/900/1800/1900/2100/2300/2500 frequency bands, as are commonly used worldwide.

The antenna structure 100 sets the metal piece 14, the connecting piece 23, and the display unit 203 to form the resonance radiation chamber, the electrical current supplied to the antenna structure 100 may be coupled to the connecting piece 23 (hinge), so the hinge may be a part of the electrical current conduct path, thus the antenna structure 100 may cover multiple frequency bands, such as the WI-FI 2.4 GHz and WI-FI 5 GHz, improving the frequency width of the antenna structure 100, so the antenna structure 100 may have greater width of frequency and antenna radiation efficiency, covering frequency bands commonly used worldwide and being beneficial to the carrier aggregation application, meanwhile having a MIMO characteristic.

Figure 10:
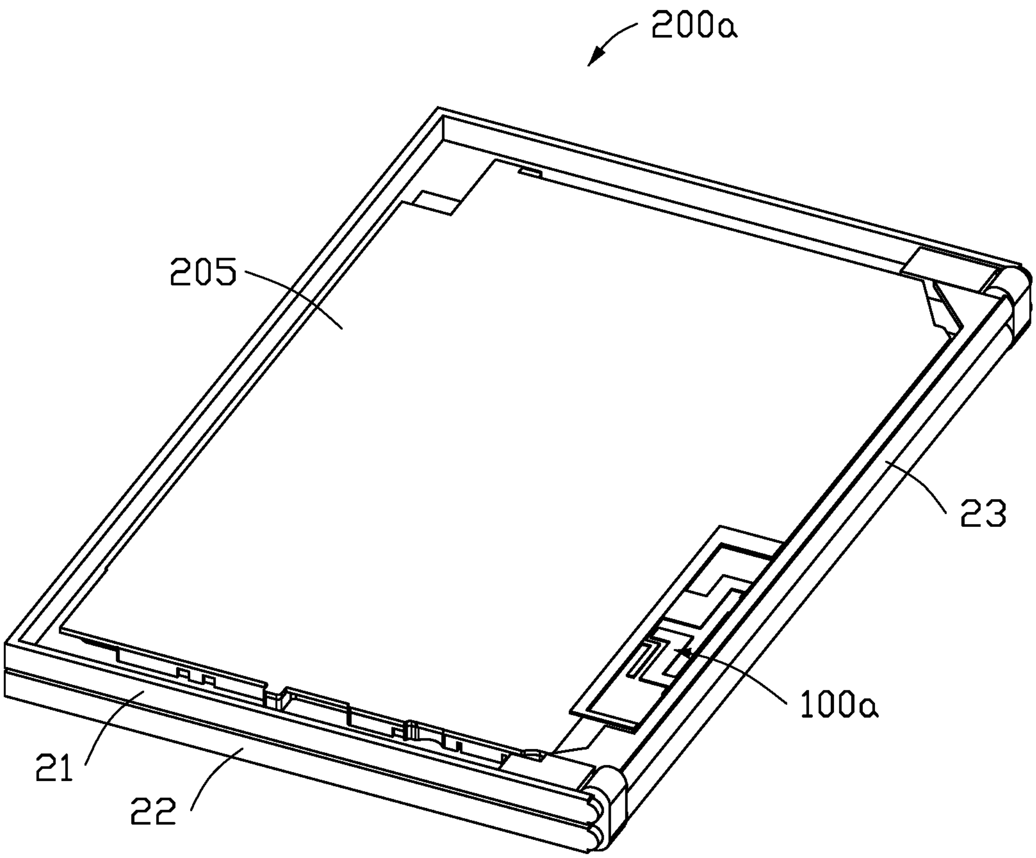
FIG. 10 is a schematic diagram of a second embodiment of an antenna structure applied in the wireless communication device.
Figure 11:
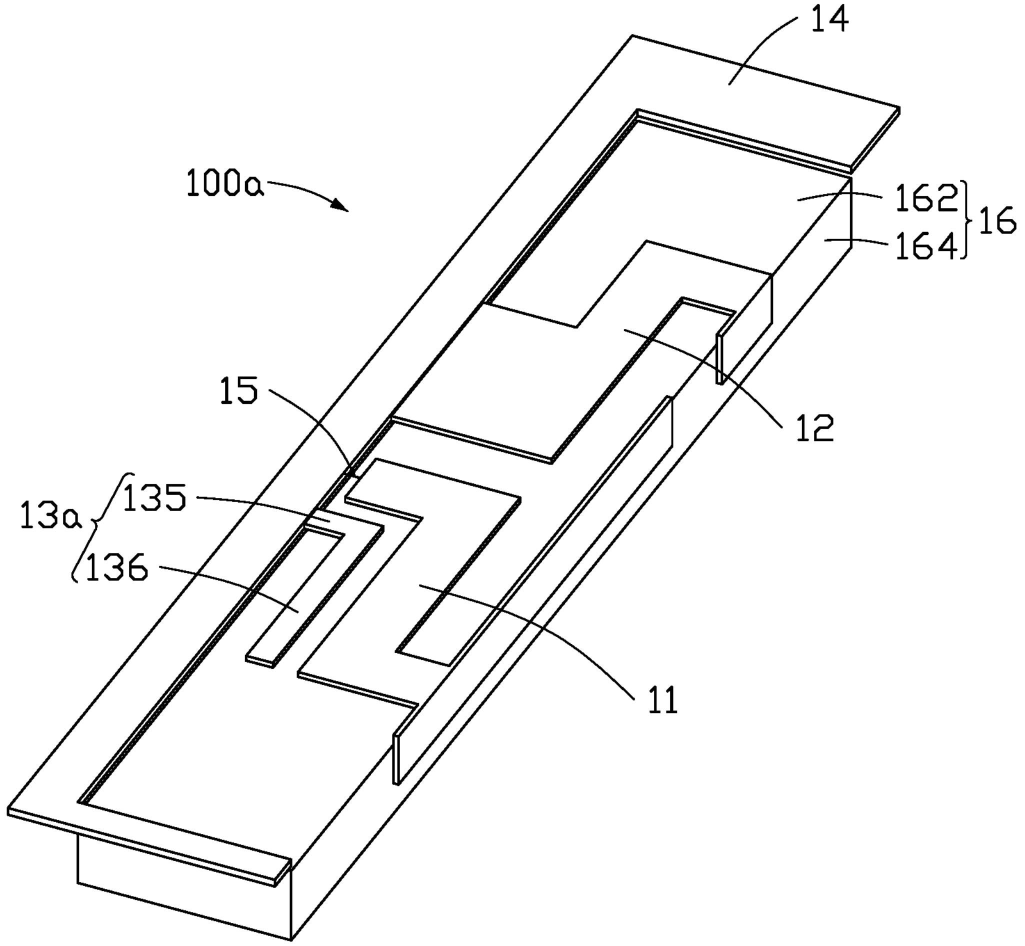
FIG. 11 is a schematic diagram of the antenna structure of FIG. 10.
Figure 12:
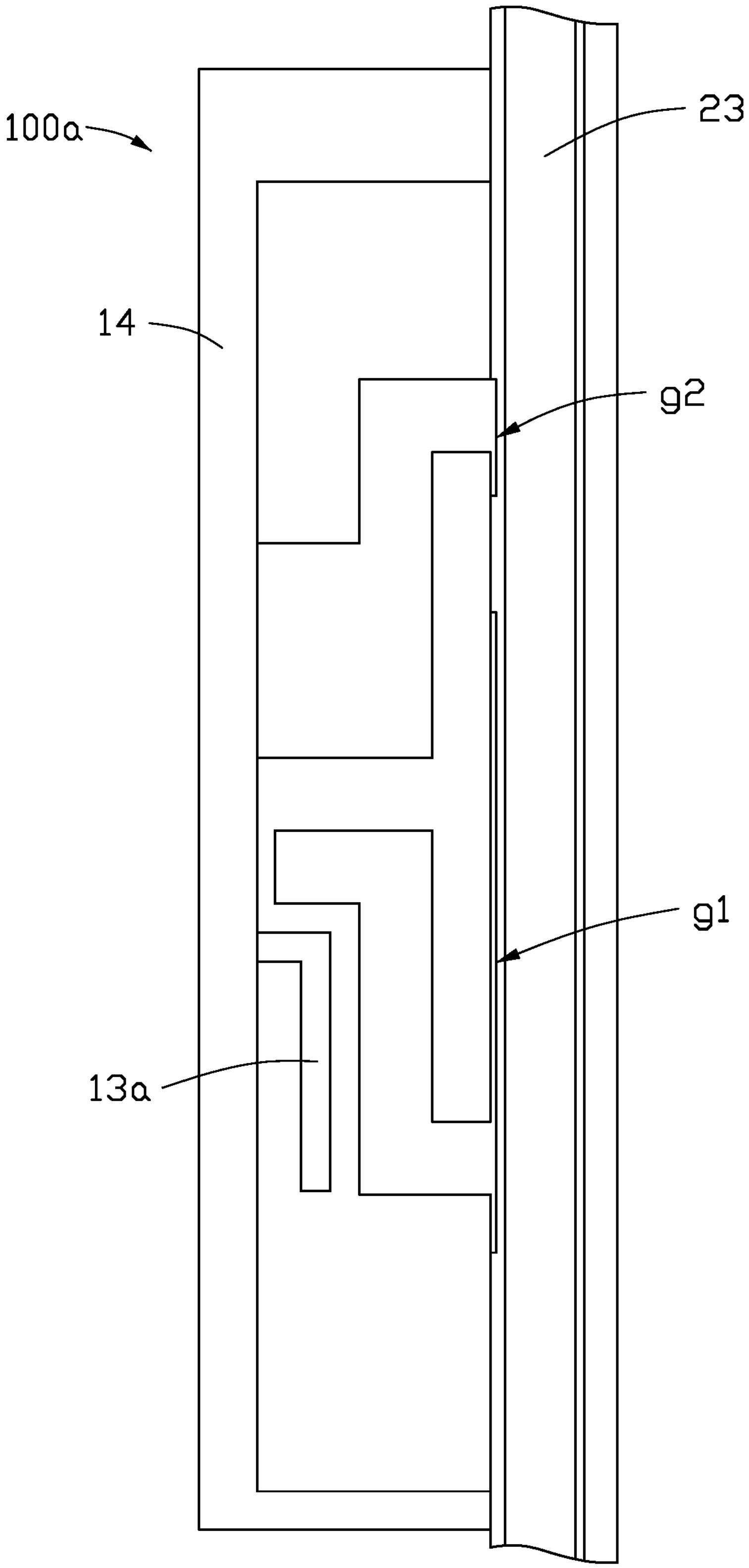
FIG. 12 is another schematic diagram of the antenna structure of FIG. 10.

FIGS. 10, 11, and 12 illustrate a second embodiment of a wireless communication device 200*a* using an antenna structure 100*a*.

Comparing the antenna structure 100*a* of the second embodiment to the antenna structure 100 of the first embodiment, the antenna structure 100*a* includes a third radiation portion 13*a*, replacing the third radiation portion 13 of the antenna structure 100. Other parts of the antenna structure 100*a* are similar to the other parts of the antenna structure 100.

The third radiation portion 13*a* is substantially L-shaped and includes an eleventh radiation section 135 and a twelfth radiation section 136 perpendicularly connected in order. The eleventh radiation section 135 and the twelfth radiation section 136 are substantially strips of material, positioned on a same plane and arranged on the first plane 162. An end of the eleventh radiation section 135 that is away from the twelfth radiation section 136 is grounded, for grounding the antenna structure 100*a*, and spaced apart from the metal piece 14. The eleventh radiation section 135 is substantially parallel with and spaced from the first radiation section 112. The twelfth radiation section 136 is substantially parallel with and spaced from the second radiation section 114, a free end of the twelfth radiation section 136 is aligned with the third radiation section 116. A length of the eleventh radiation section 135 is less than a length of the twelfth radiation section 136.

In at least one embodiment, when the first radiation portion 11 supplies an electrical current from the feed point of the circuit board 205 through the feed portion 15, the electrical current will flow through the first radiation portion 11, and be coupled to the connected piece 23, the electrical current will further be coupled to the second radiation portion 12, the third radiation portion 13*a*, and the metal piece 14, the electrical current is conducted in the metal piece 14, so the first radiation portion 11, the connecting piece 23, the metal piece 14, and the display unit 201 cooperatively form a metal resonance chamber structure, to excite a fourth working mode and generate a radiation signal in a fourth radiation frequency band. In at least one embodiment, the fourth working mode includes a low frequency mode, a frequency of the fourth radiation frequency band includes a frequency band with a central frequency of 2440 MHz.

In at least one embodiment, when the first radiation portion 11 supplies an electrical current from the feed point of the circuit board 205 through the feed portion 15, the electrical current will flow through the first radiation portion 11, and be coupled to the connected piece 23, the electrical current will further be coupled to the second radiation portion 12, the third radiation portion 13*a*, and the metal piece 14, the electrical current is conducted in the metal piece 14, so the first radiation portion 11, the connecting piece 23, the metal piece 14, and the display unit 201 cooperatively form a metal resonance chamber structure, to excite a fifth working mode and generate a radiation signal in a fifth radiation frequency band. In at least one embodiment, the fifth working mode includes a frequency doubling of the low frequency mode, a frequency of the fifth radiation frequency band includes a frequency band with a central frequency of 5100 MHz.

When the first radiation portion 11 supplies an electrical current from the feed point of the circuit board 205 through the feed portion 15, the electrical current will flow through the first radiation portion 11, and be coupled to the connected piece 23, the electrical current will further be coupled to the second radiation portion 12 and the third radiation portion 13*a*, so the first radiation portion 11, the connecting piece 23, and the display unit 201 cooperatively form a metal resonance chamber structure, to excite a sixth working mode and generate a radiation signal in a sixth radiation frequency band. In at least one embodiment, the sixth working mode includes a high frequency mode, a frequency of the sixth radiation frequency band includes a frequency band with a central frequency of 5300 MHz.

When the first radiation portion 11 supplies an electrical current from the feed point of the circuit board 205 through the feed portion 15, the electrical current will flow through the first radiation portion 11, and be coupled to the third radiation portion 13*a*, so the third radiation portion 13*a* may excite a seventh working mode and generate a radiation signal in a seventh radiation frequency band. In at least one embodiment, the seventh working mode includes a high frequency mode, a frequency of the seventh radiation frequency band includes a frequency band with a central frequency of 5700 MHz.

In at least one embodiment, the fourth working mode may cover the WI-FI 2.4G mode, the fourth radiation frequency band may include a frequency band of 2400-2480 MHz. The fifth working mode, the sixth working mode, and the seventh working mode may cover the WI-FI 5G mode, the fifth radiation frequency band, the sixth radiation frequency band, and the seventh radiation frequency band may include a frequency band of 5180-5800 MHz.

In at least one embodiment, the first radiation portion 11 supplies the electrical current through the feed portion 15, and couples the electrical current to the connected piece 23 and the second radiation portion 12, so as to form a multi-loop antenna.

Figure 13:
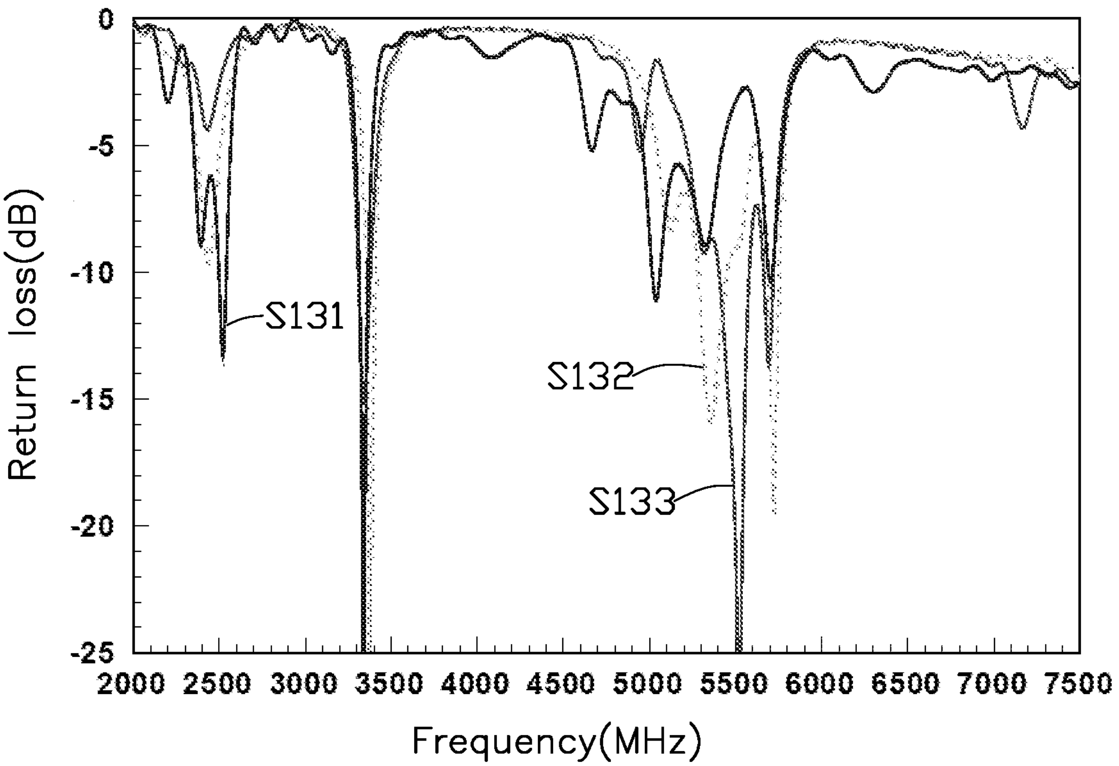
FIG. 13 is a return loss graph of the antenna structure of FIG. 10 is working.

FIG. 13 illustrates a graph of return loss of the antenna structure 100*a* when the wireless communication device 200*a* is working in three modes (the tablet mode, the phone mode, and the standby mode). A curve S131 shows a return loss value of the antenna structure 100*a* when the wireless communication device 200*a* is in the phone mode. A curve S132 shows a return loss value of the antenna structure 100*a* when the wireless communication device 200*a* is in the tablet mode. A curve S133 shows a return loss value of the antenna structure 100*a* when the wireless communication device 200*a* is in the standby mode.

Figure 14:
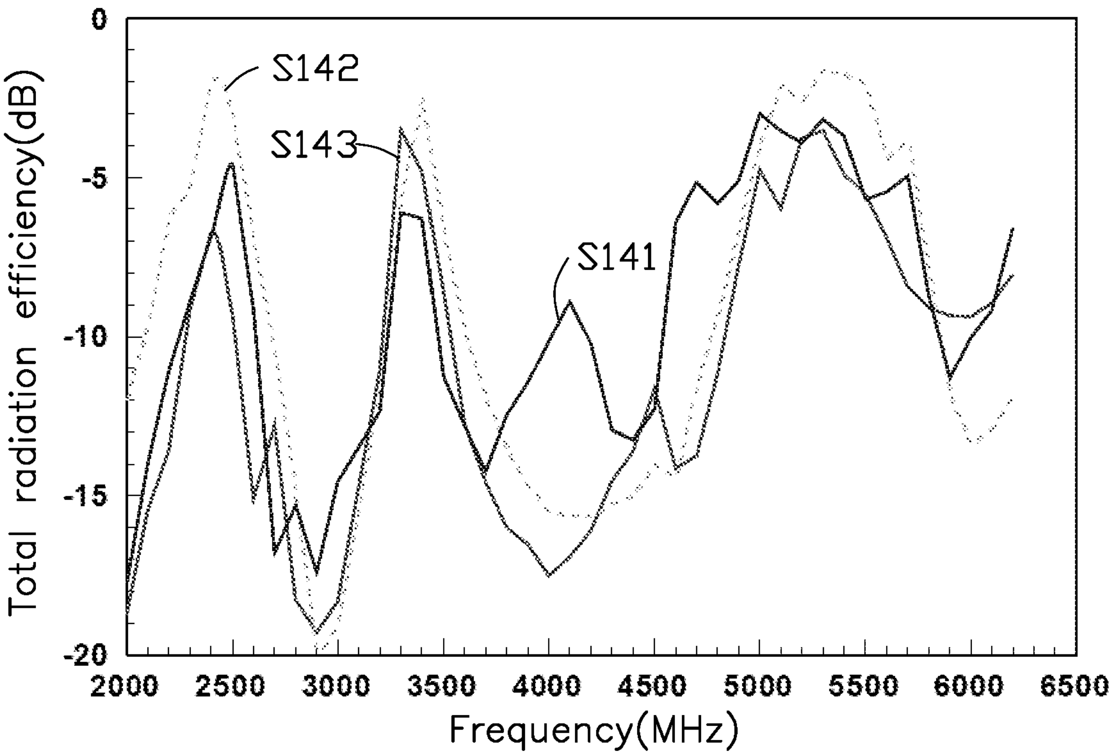
FIG. 14 is a total radiation efficiency graph when the antenna structure of FIG. 10 is working.

FIG. 14 illustrates a graph of total radiation efficiency of the antenna structure 100*a* when the wireless communication device 200*a* is working in three modes (the tablet mode, the phone mode, and the standby mode). A curve S141 shows a total radiation efficiency of the antenna structure 100*a* when the wireless communication device 200*a* is in the phone mode. A curve S142 shows a total radiation efficiency of the antenna structure 100*a* when the wireless communication device 200*a* is in the tablet mode. A curve S143 shows a total radiation efficiency of the antenna structure 100*a* when the wireless communication device 200*a* is in the standby mode. In combination of an even efficiency of the antenna structure 100*a* as shown in table 2, the antenna structure 200*a* may have a high radiation characteristic of −2.1~−7.4 dB at designed frequency band in different modes.

TABLE 2

| | antenna structure 100a | |
|---|---|---|
| | WI-FI 2.4G 2400-2480 MHz | WI-FI 5G 5180-5800 MHz |
| total radiation efficiency in the phone mode (dB) | −6.4 | −4.5 |
| total radiation efficiency in the tablet mode (dB) | −2.6 | −3.9 |
| total radiation efficiency in the standby mode (dB) | −6.5 | −3.7 |

FIGS. 13 and 14 show that the antenna structure 100*a* may cover frequency bands of WI-FI 2.4 GHz and WI-FI 5 GHz, and provide greater width of frequency and antenna efficiency, and is beneficial to a carrier aggregation application (CA) of LTE-A. In other embodiments, the antenna structure 100*a* may work at different working modes, such as the low frequency mode, the middle frequency mode, the high frequency mode, the ultra-middle frequency mode, the ultra-high frequency mode, 5G N78 mode, and the 5G N79 mode, and cover communication bands as commonly used in the world. In detail, the antenna structure 100*a* may cover GSM850/900/WCDMA Band5/Band8/Band13/Band17/Band20 at the low frequencies, GSM 1800/1900/WCDMA 2100 (1710-2170 MHz) at the middle frequencies, LTE-A Band 7, Band 40, Band 41 (2300-2690 MHz) at the high frequencies, 1427-1518 MHz at the ultra-middle frequencies, 3400-3800 MHz at the ultra-high frequencies, and N78 (3300-3800 MHz), and N79 (4400-5000 MHz) at 5G frequencies range. The designed frequency bands of the antenna structure 100*a* may be applied to the operation of GSM Qual-band, UMTS Band I/II/V/VIII frequency bands, and LTE 850/900/1800/1900/2100/2300/2500 frequency bands, as are commonly used worldwide.

The antenna structure 100*a* sets the metal piece 14, the connecting piece 23, and the display unit 203 to form the resonance radiation chamber, for the electrical current directed to the antenna structure 100*a* may be coupled to the connecting piece 23 (hinge), so the hinge may be a part of the electrical current conduct path, thus the antenna structure 100*a* may cover multiple frequency bands, such as the WI-FI 2.4 GHz and WI-FI 5 GHz, improving the frequency width of the antenna structure 100*a*, so the antenna structure 100*a* may also have antenna radiation efficiency, covering frequency bands commonly used worldwide and being beneficial to the carrier aggregation application, meanwhile having a MIMO characteristic.

Figure 15:
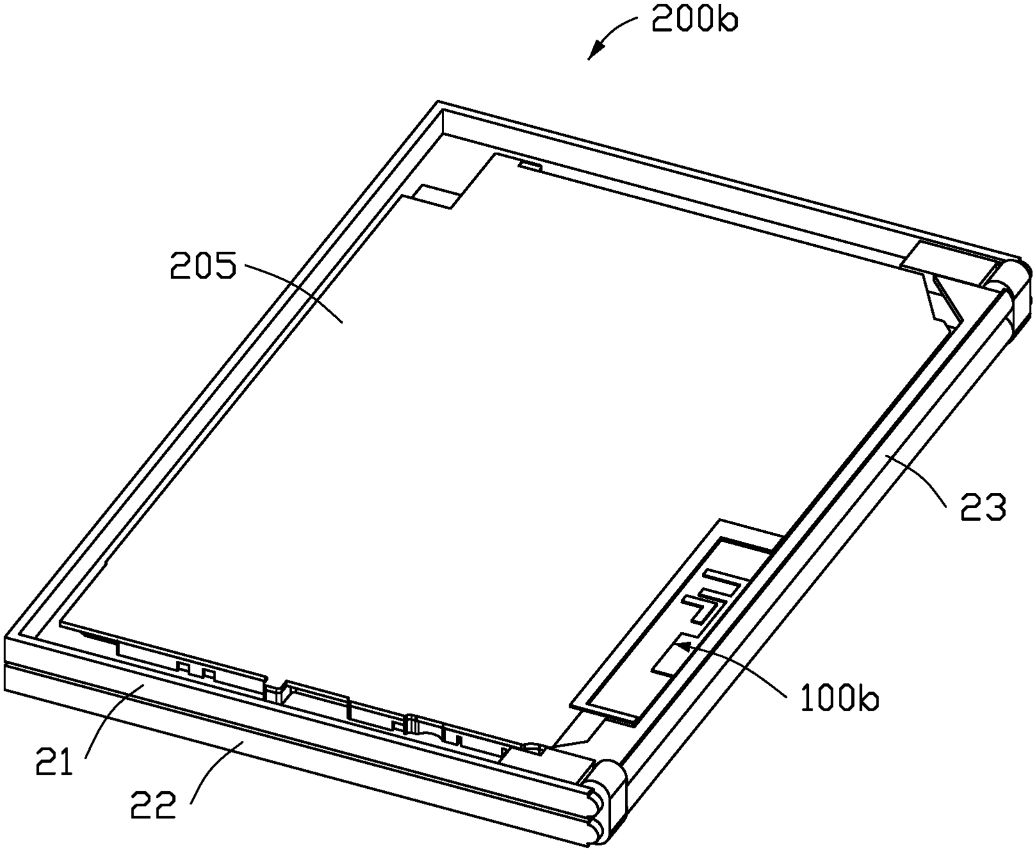
FIG. 15 is a schematic diagram of a third embodiment of an antenna structure applied in the wireless communication device.
Figure 16:
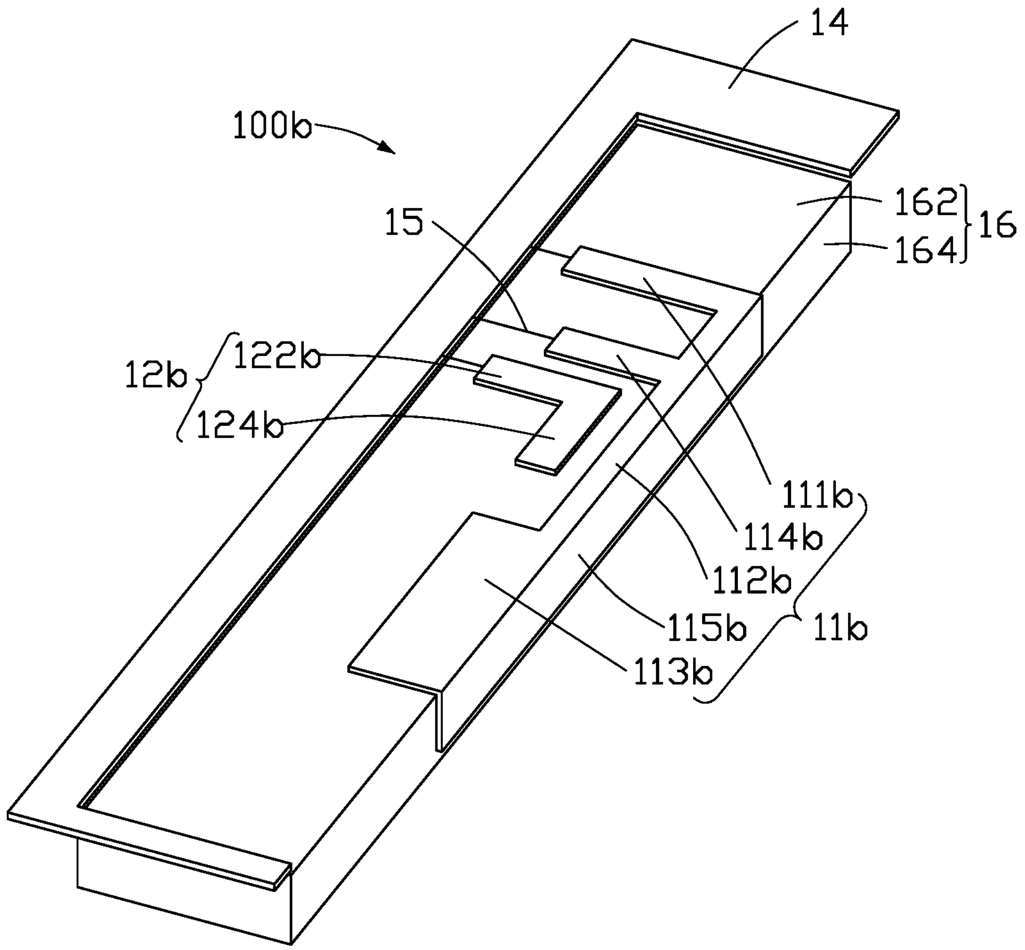
FIG. 16 is a schematic diagram of the antenna structure of FIG. 15.
Figure 17:
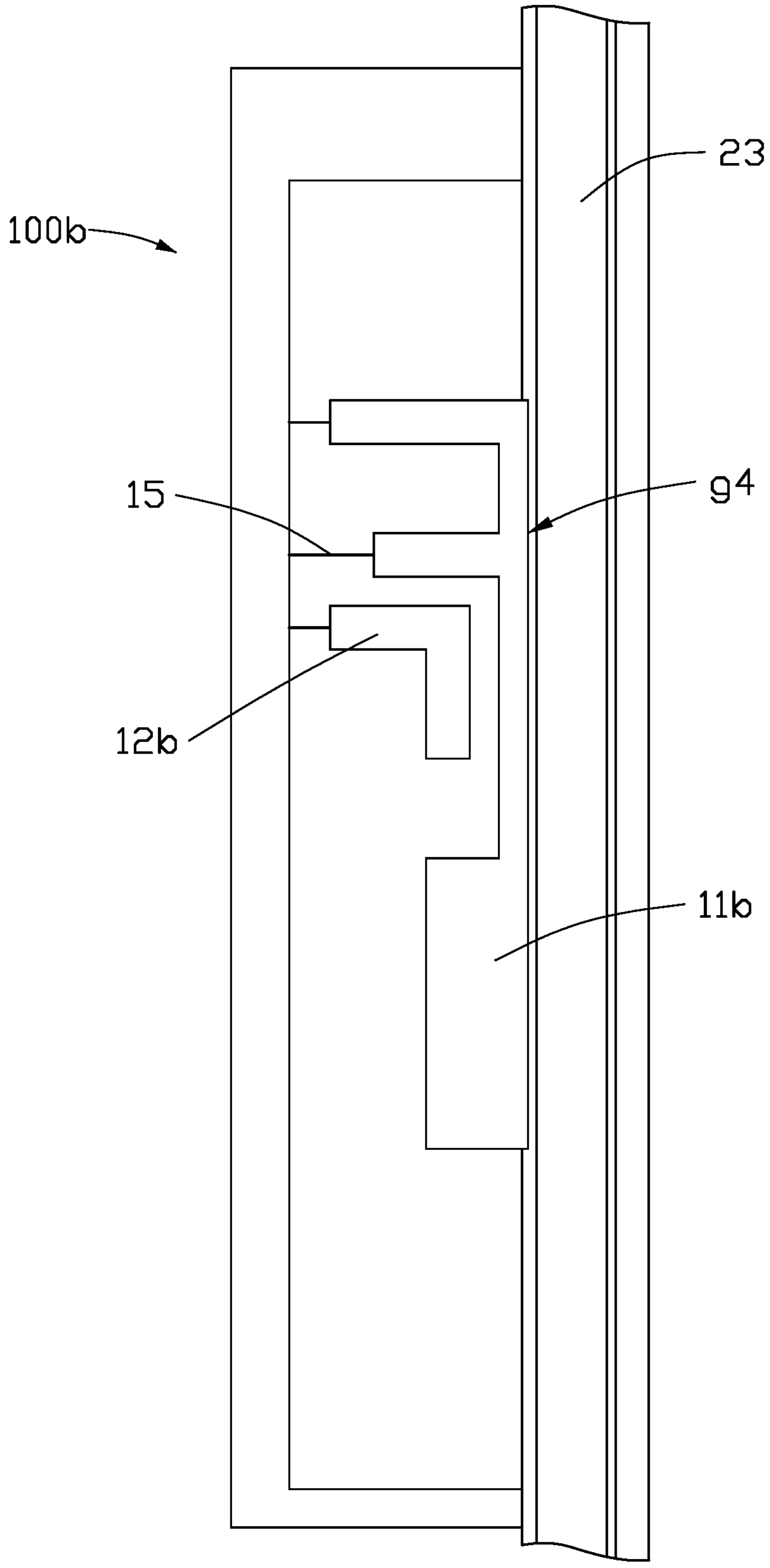
FIG. 17 is another schematic diagram of the antenna structure of FIG. 15.

FIGS. 15, 16, and 17 illustrate a third embodiment of a wireless communication device 200*b* using an antenna structure 100*b*.

Comparing the antenna structure 100*b* of the third embodiment to the antenna structure 100 of the first embodiment, the antenna structure 100*b* includes a first radiation portion 11*b* and a second radiation portion 12*b*, replacing the first radiation portion 11, the second radiation portion 12, and the third radiation portion 13 of the antenna structure 100. Other parts of the antenna structure 100*a* are similar to the other parts of the antenna structure 100.

The first radiation portion 11*b* includes a thirteenth radiation section 111*b*, a fourteenth radiation section 112*b*, a fifteenth radiation section 113*b*, a sixteenth radiation section 114*b*, and a seventeenth radiation section 115*b*. The thirteenth radiation section 111*b*, the fourteenth radiation section 112*b*, and the fifteenth radiation section 113*b* are substantially rectangular sheets. The thirteenth radiation section 111*b*, the fourteenth radiation section 112*b*, the fifteenth radiation section 113*b*, and the sixteenth radiation section 114*b* are positioned on a same plane and arranged on the first plane 162. The seventeenth radiation section 115*b* is positioned on another plane and is arranged on the second plane 164.

The thirteenth radiation section 111*b* is substantially perpendicular to an end of the fourteenth radiation section 112*b*, other end of the thirteenth radiation section 111*b* that is away from the fourteenth radiation section 112*b* is grounded (that is, the end of the thirteenth radiation section 111*b* that is away from the fourteenth radiation section 112*b* may be a grounded end), for grounding the antenna structure 100*b*, and spaced apart from the metal piece 14. The fifteenth radiation section 113*b* is connected to other end of the fourteenth radiation section 112*b*, an extending direction of the fifteenth radiation section 113*b* is same as an extending direction of the fourteenth radiation section 112*b*, a width of the fifteenth radiation section 113*b* is greater than a width of the fourteenth radiation section 112*b*. The sixteenth radiation section 114*b* is substantially perpendicular to a side of the fourteenth radiation section 112*b*, and is spaced apart from and parallel with the thirteenth radiation section 111*b*. The sixteenth radiation section 114*b* and the thirteenth radiation section 111*b* are positioned on a same side of the fourteenth radiation section 112*b*. A free end of the sixteenth radiation section 114*b* may be electrically connected to the feed power source (or feed point) on the circuit board 205 through the feed portion 15, for feeding electrical current. In at least one embodiment, the feed portion 15 may be electrically connected the first radiation section 112 and the feed power source (or feed point) on the circuit board 205 by means of an elastic sheet, a microstrip line, a strip line, or a coaxial cable. A length of the sixteenth radiation section 114*b* is less than a length of the thirteenth radiation section 111*b*. The seventeenth radiation section 115*b* is perpendicularly connected to the fourteenth radiation section 112*b* and the fifteenth radiation section 113*b*. The seventeenth radiation section 115*b* is positioned on a side of the fourteenth radiation section 112*b* opposite to the sixteenth radiation section 114*b* and the thirteenth radiation section 111*b*. A length of the seventeenth radiation section 115*b* is substantially equal to a total length of the fourteenth radiation section 112*b* and the fifteenth radiation section 113*b*. The seventeenth radiation section 115*b* is substantially parallel with and spaced apart from the connecting piece 23. In at least one embodiment, a gap g4 (that is the gap between the first radiation portion 11*b* and the connecting piece 23) may be 0.3 millimeters.

In at least one embodiment, the first radiation portion 11*b* supplies the electrical current through the sixteenth radiation section 114*b* connecting to the feed portion 15, and conducts the electrical current to ground through the thirteenth radiation section 111*b*, so the first radiation portion 11*b* forms a PIFA antenna structure.

The second radiation portion 12*b* is positioned among the fourteenth radiation section 112*b*, the fifteenth radiation section 113*b*, and the sixteenth radiation section 114*b*. The second radiation portion 12*b* is substantially L-shaped and includes an eighteenth radiation section 122*b* and a nineteenth radiation section 124*b* connected in order. The eighteenth radiation section 122*b* and the nineteenth radiation section 124*b* are substantially strips of material. An end of the eighteenth radiation section 122*b* is perpendicularly connected to an end of the nineteenth radiation section 124*b*, other end of the eighteenth radiation section 122*b* is grounded (that is, the other end of the eighteenth radiation section 122*b* may be a grounded end), for grounding the antenna structure 100*b*, and spaced apart from the metal piece 14. The eighteenth radiation section 122*b* is substantially parallel with and spaced apart from the sixteenth radiation section 114*b*. The nineteenth radiation section 124*b* is substantially parallel with and spaced apart from the fourteenth radiation section 112*b*. A free end of the nineteenth radiation section 124*b* is spaced apart from and corresponds to the fifteenth radiation section 113*b*.

In at least one embodiment, when the first radiation portion 11*b* supplies an electrical current from the feed point of the circuit board 205 through the sixteenth radiation section 114*b* and the feed portion 15, the electrical current will flow through the first radiation portion 11*b*, and be coupled to the connected piece 23 and the metal piece 14, the electrical current will then flow to ground through the thirteenth radiation section 111*b*, the electrical current is further conducted in the metal piece 14, so the first radiation portion 11*b*, the connecting piece 23, the metal piece 14, and the display unit 201 cooperatively form a metal resonance chamber structure, to excite an eighth working mode and generate a radiation signal in an eighth radiation frequency band. In at least one embodiment, the eighth working mode includes a low frequency mode, a frequency of the eighth radiation frequency band includes a frequency band with a central frequency of 2440 MHz.

In at least one embodiment, when the first radiation portion 11*b* supplies an electrical current from the feed point of the circuit board 205 through the sixteenth radiation section 114*b* and the feed portion 15, the electrical current will flow through the first radiation portion 11*b*, and be coupled to the connected piece 23 and the metal piece 14, the electrical current will then flow to ground through the thirteenth radiation section 111*b*, the electrical current is further conducted in the metal piece 14, so the first radiation portion 11*b*, the connecting piece 23, the metal piece 14, and the display unit 201 cooperatively form a metal resonance chamber structure, to excite a ninth working mode and generate a radiation signal in a ninth radiation frequency band. In at least one embodiment, the nineth working mode includes a frequency doubling of the low frequency mode, a frequency of the nineth radiation frequency band includes a frequency band with a central frequency of 4780 MHz.

In at least one embodiment, when the first radiation portion 11*b* supplies an electrical current from the feed point of the circuit board 205 through the sixteenth radiation section 114*b* and the feed portion 15, the electrical current will flow through the first radiation portion 11*b*, and be coupled to the connected piece 23, the electrical current will flow to ground through the thirteenth radiation section 111*b*, so the first radiation portion 11*b*, the connecting piece 23, and the display unit 201 cooperatively form a metal resonance chamber structure, to excite a tenth working mode and generate a radiation signal in a tenth radiation frequency band. In at least one embodiment, the tenth working mode includes a high frequency mode, a frequency of the tenth radiation frequency band includes a frequency band with a central frequency of 5250 MHz.

In at least one embodiment, when the first radiation portion 11*b* supplies an electrical current from the feed point of the circuit board 205 through the sixteenth radiation section 114*b* and the feed portion 15, the electrical current will flow through the first radiation portion 11*b*, and be coupled to the second radiation portion 12*b*, the electrical current will flow to ground through the second radiation portion 12*b*, so the second radiation portion 12*b* excites an eleventh working mode and generates a radiation signal in an eleventh radiation frequency band. In at least one embodiment, the eleventh working mode includes a high frequency mode, a frequency of the eleventh radiation frequency band includes a frequency band with a central frequency of 5750 MHz.

In at least one embodiment, the eighth working mode may cover the WI-FI 2.4G mode, the eighth radiation frequency band may include a frequency band of 2400-2480 MHz. The ninth working mode, the tenth working mode, and the eleventh working mode may cover the WI-FI 5G mode, and the ninth radiation frequency band, the tenth radiation frequency band, and the eleventh radiation frequency band may include a frequency band of 5180-5800 MHz.

Figure 18:
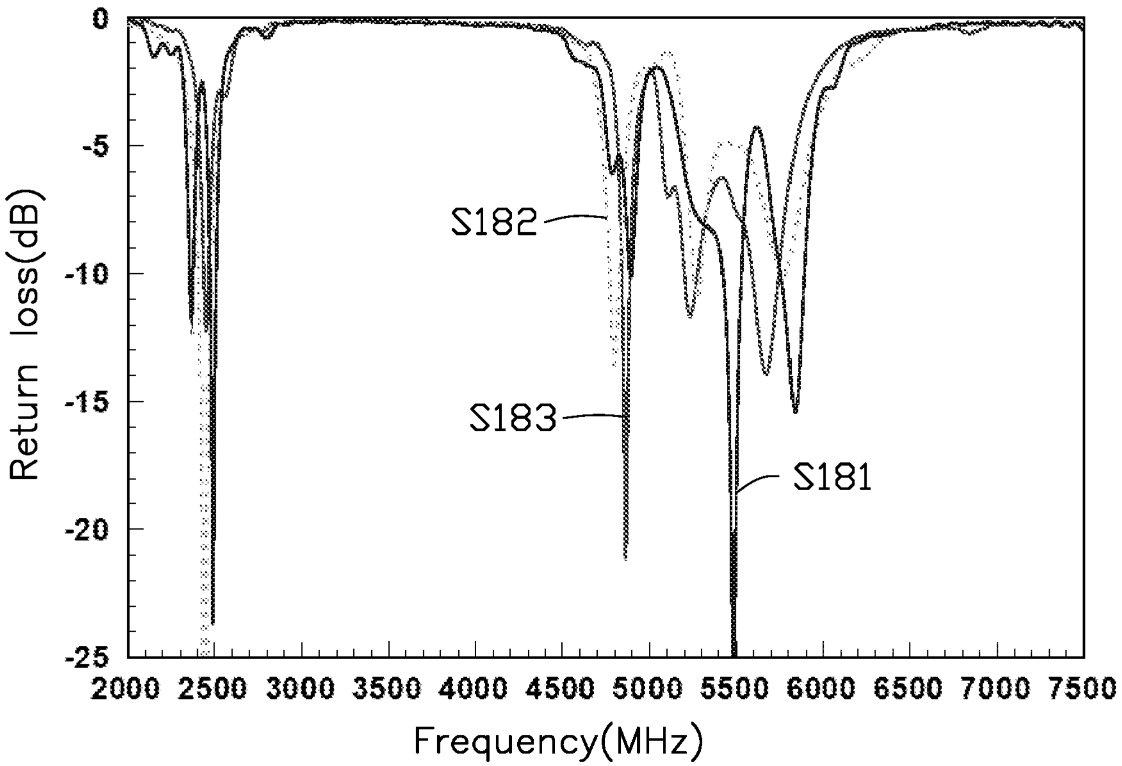
FIG. 18 is a return loss graph when the antenna structure of FIG. 15 is working.

FIG. 18 shows return loss of the antenna structure 100*b* when the wireless communication device 200*b* is working in three modes (the tablet mode, the phone mode, and the standby mode). A curve S181 shows a return loss value of the antenna structure 100*b* when the wireless communication device 200*b* is in the phone mode. A curve S182 shows a return loss value of the antenna structure 100*b* when the wireless communication device 200*b* is in the tablet mode. A curve S183 shows a return loss value of the antenna structure 100*b* when the wireless communication device 200*b* is in the standby mode.

Figure 19:
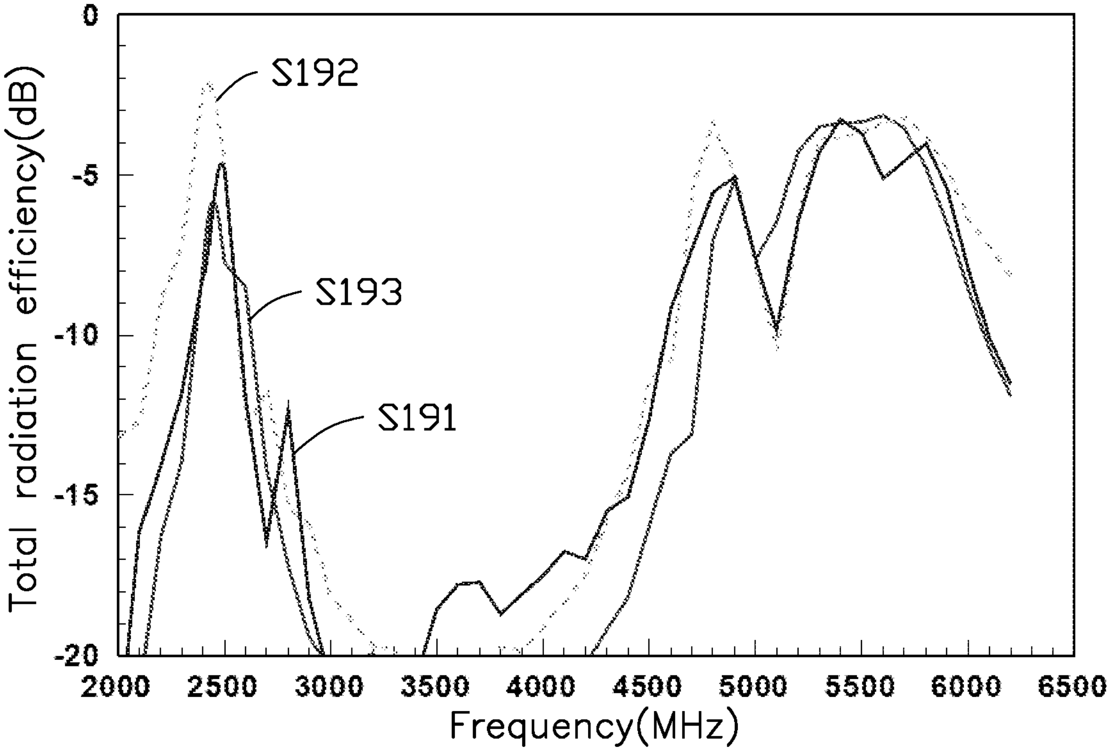
FIG. 19 is a total radiation efficiency graph when the antenna structure of FIG. 15 is working.

FIG. 19 illustrates a graph of total radiation efficiency of the antenna structure 100*b* when the wireless communication device 200*b* is working in three modes (the tablet mode, the phone mode, and the standby mode). A curve S191 shows a total radiation efficiency of the antenna structure 100*b* when the wireless communication device 200*b* is in the phone mode. A curve S192 shows a total radiation efficiency of the antenna structure 100*b* when the wireless communication device 200*b* is in the tablet mode. A curve S193 shows a total radiation efficiency of the antenna structure 100*b* when the wireless communication device 200*b* is in the standby mode. In combination of an even efficiency of the antenna structure 100*a* ab shown in table 3, the antenna structure 200*b* may have a great radiation characteristic of −2.6~−6.5 dB at designed frequency band in different modes.

TABLE 3

| | antenna structure 100b | |
|---|---|---|
| | WI-FI 2.4G 2400-2484 MHz | WI-FI 5G 5180-5800 MHz |
| total radiation efficiency in the phone mode (dB) | −6.4 | −4.5 |
| total radiation efficiency in the tablet mode (dB) | −2.6 | −3.9 |
| total radiation efficiency in the standby mode (dB) | −6.5 | −3.7 |

FIGS. 18 and 19 show that the antenna structure 100*b* may cover frequency bands of WI-FI 2.4 GHz and WI-FI 5 GHz, improve a frequency width and antenna efficiency, and be beneficial for carrier aggregation application (CA) of LTE-A. In other embodiments, the antenna structure 100*b* may work at different working modes, such as the low frequency mode, the middle frequency mode, the high frequency mode, the ultra-middle frequency mode, the ultra-high frequency mode, 5G N78 mode, and the 5G N79 mode, and cover communication bands as commonly used in the world. In detail, the antenna structure 100*b* may cover GSM850/900/WCDMA Band5/Band8/Band13/Band17/Band20 at the low frequencies, GSM 1800/1900/WCDMA 2100 (1710-2170 MHz) at the middle frequencies, LTE-A Band 7, Band 40, Band41 (2300-2690 MHz) at the high frequencies, 1427-1518 MHz at the ultra-middle frequencies, 3400-3800 MHz at the ultra-high frequencies, and N78 (3300-3800 MHz), and N79 (4400-5000 MHz) at 5G frequency ranges. The designed frequency bands of the antenna structure 100*b* may be applied to the operation of GSM Qual-band, UMTS Band I/II/V/VIII frequency bands, and LTE 850/900/1800/1900/2100/2300/2500 frequency bands, as are commonly used worldwide.

The antenna structure 100*b* sets the metal piece 14, the connecting piece 23, and the display unit 203 as the resonance radiation chamber, for the electrical current supplied by the antenna structure 100*b* may be coupled to the connecting piece 23 (hinge), so the hinge may be a part of the electrical current conduct path, thus the antenna structure 100*b* may cover multiple frequency bands, such as the WI-FI 2.4 GHz and WI-FI 5 GHz, improving the frequency width of the antenna structure 100*b*, and increasing antenna radiation efficiency, covering frequency bands commonly used worldwide and being beneficial for carrier aggregation application, meanwhile having a MIMO characteristic.

In another embodiment, the antenna structure may be not arranged on the carrier, but attached to a side of the circuit board close to the hinge (connecting piece), so the antenna structure may be spaced apart from the hinge, the electrical current in the antenna structure may be coupled to the hinge for expanding the electrical current conduction path and improving a radiation frequency width of the antenna structure.

In another embodiment, the antenna structure may be arranged in either the first housing 21 or the second housing 22.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure applied in a wireless communication device, the wireless communication device comprising a hinge, the antenna structure comprising:

a feed portion;

a first radiation portion, an end of the first radiation portion electrically connected to the feed portion, another end of the first radiation portion spaced from the hinge with a first gap; and at least one ground portion;

wherein the antenna structure generates a radiation signal in at least one radiation frequency band when the feed portion feeds electrical current to the first radiation portion and the hinge couples the electrical current from the first radiation portion;

the first radiation portion comprises a first radiation section, a second radiation section, a third radiation section, and a fourth radiation section connected in order; the first radiation section and the third radiation section are perpendicularly connected to two ends of the second radiation section and extend in opposite directions; one end of the first radiation section is electrically connected to a feed power source through the feed portion; the fourth radiation section is perpendicularly connected to an end of the third radiation section that away from the second radiation section, the fourth radiation section is parallel with the second radiation section, the fourth radiation section and the second radiation section extend in a same direction from two ends of the third radiation section; the fourth radiation section is parallel with and spaced apart from the hinge with the first gap; a length of the fourth radiation section is greater than a length of the second radiation section.

2. The antenna structure of claim 1, further comprising a metal piece surrounding the first radiation portion, wherein the first radiation portion, the hinge, and the metal piece form a resonance chamber.

3. The antenna structure of claim 2, further comprising a second radiation portion, wherein the second radiation portion comprises a fifth radiation section, a sixth radiation section, a seventh radiation section, and an eighth radiation section connected in order; the fifth radiation section and the seventh radiation section are perpendicularly connected to two ends of the sixth radiation section and extend in opposite directions; one end of the fifth radiation section is grounded and spaced apart from the metal piece; the eighth radiation section is perpendicularly connected to an end of the seventh radiation section that away from the sixth radiation section, the eighth radiation section is parallel with the sixth radiation section, the eighth radiation section and the sixth radiation section extend in a same direction from two ends of the seventh radiation section; the eighth radiation section is parallel with and spaced apart from the hinge with a second gap; a length of the eighth radiation section is less than a length of the sixth radiation section.

4. The antenna structure of claim 3, further comprising a third radiation portion, wherein the third radiation portion comprises a ninth radiation section and a tenth radiation section, an end of the ninth radiation section that away from the tenth radiation section is grounded, and spaced apart from the metal piece; the tenth radiation section is perpendicularly connected to the ninth radiation section, the tenth radiation section is parallel with and spaced apart from the hinge with a third gap; a length of the tenth radiation section is less than a length of the ninth radiation section.

5. The antenna structure of claim 4, wherein the first radiation section, the second radiation section, the third radiation section, the fifth radiation section, the sixth radiation section, the seventh radiation section, and the ninth radiation section are coplanar and positioned in a first plane; the fourth radiation section, the eighth radiation section, and the tenth radiation section are coplanar and positioned in a second plane; the first plane is perpendicular to the second plane.

6. The antenna structure of claim 3, further comprising a third radiation portion, wherein the third radiation portion comprises an eleventh radiation section and a twelfth radiation section; the eleventh radiation section is perpendicularly connected to the twelfth radiation section; an end of the eleventh radiation section that away from the twelfth radiation section is grounded, and spaced apart from the metal piece; the eleventh radiation section is parallel with and spaced apart from the first radiation section, a free end of the twelfth radiation section is aligned with the third radiation section; a length of the eleventh radiation section is less than a length of the twelfth radiation section.

7. The antenna structure of claim 6, wherein the first radiation section, the second radiation section, the third radiation section, the fifth radiation section, the sixth radiation section, the seventh radiation section, the eleventh radiation section, and the twelfth radiation section are coplanar and positioned in a first plane; the fourth radiation section and the eighth radiation section are coplanar and positioned in a second plane; the first plane is perpendicular to the second plane.

8. The antenna structure of claim 2, wherein the first radiation portion comprises a thirteenth radiation section, a fourteenth radiation section, a fifteenth radiation section, a sixteenth radiation section, and a seventeenth radiation section; the thirteenth radiation section is perpendicular to an end of the fourteenth radiation section, one end of the thirteenth radiation section that away from the fourteenth radiation section is grounded, and spaced apart from the metal piece; the fifteenth radiation section is connected to another end of the fourteenth radiation section, an extending direction of the fifteenth radiation section is a same with an extending direction of the fourteenth radiation section, a width of the fifteenth radiation section is greater than a width of the fourteenth radiation section; the sixteenth radiation section is perpendicular to a side of the fourteenth radiation section, spaced apart from and parallel with the thirteenth radiation section; the sixteenth radiation section and the thirteenth radiation section are positioned on a same side of the fourteenth radiation section; an end of the sixteenth radiation section that away from the fourteenth radiation section is electrically connected to the feed portion; a length of the sixteenth radiation section is less than a length of the thirteenth radiation section; the seventeenth radiation section is perpendicularly connected to the fourteenth radiation section and the fifteenth radiation section; the seventeenth radiation section is positioned on a side of the fourteenth radiation section opposite to the sixteenth radiation section and the thirteenth radiation section; a length of the seventeenth radiation section is equal to a total length of the fourteenth radiation section and the fifteenth radiation section; the seventeenth radiation section is parallel with and spaced apart from the hinge with a fourth gap.

9. The antenna structure of claim 8, further comprising a second radiation portion, wherein the second radiation portion is positioned among the fourteenth radiation section, the fifteenth radiation section, and the sixteenth radiation section; the second radiation portion comprises an eighteenth radiation section and a nineteenth radiation section connected in that order; an end of the eighteenth radiation section is perpendicularly connected to an end of the nineteenth radiation section, another end of the eighteenth radiation section is grounded, and spaced apart from the metal piece; the eighteenth radiation section is substantially parallel with and spaced apart from the sixteenth radiation section; the nineteenth radiation section is parallel with and spaced apart from the fourteenth radiation section; a free end of the nineteenth radiation section is spaced apart from and corresponding to the fifteenth radiation section.

10. The antenna structure of claim 9, wherein the thirteenth radiation section, the fourteenth radiation section, the fifteenth radiation section, and the sixteenth radiation section are coplanar and positioned in a first plane; the seventeenth radiation section is positioned in a second plane; the first plane is perpendicular to the second plane.

11. A wireless communication device comprising:

a hinge; and an antenna structure comprising:

a feed portion;

a first radiation portion, an end of the first radiation portion electrically connected to the feed portion, another end of the first radiation portion spaced from the hinge with a first gap; and at least one ground portion;

wherein the antenna structure generates a radiation signal in at least one radiation frequency band when the feed portion feeds electrical current to the first radiation portion and the hinge couples the electrical current from the first radiation portion;

the first radiation portion comprises a first radiation section, a second radiation section, a third radiation section, and a fourth radiation section connected in order; the first radiation section and the third radiation section are perpendicularly connected to two ends of the second radiation section and extend in opposite directions; one end of the first radiation section is electrically connected to a feed power source through the feed portion; the fourth radiation section is perpendicularly connected to an end of the third radiation section that away from the second radiation section, the fourth radiation section is parallel with the second radiation section, the fourth radiation section and the second radiation section extend in a same direction from two ends of the third radiation section; the fourth radiation section is parallel with and spaced apart from the hinge with the first gap; a length of the fourth radiation section is greater than a length of the second radiation section.

12. The wireless communication device of claim 11, further comprising a first housing, a second housing, and a display unit, wherein the first housing is rotatably connected to the second housing through the hinge, each of the first housing and the second housing is arranged with the display unit, the antenna structure is received in one of the first housing and the second housing.

13. The wireless communication device of claim 12, wherein the antenna structure further comprises a metal piece, the metal piece surrounds the first radiation portion, the first radiation portion, the hinge, and the metal piece cooperatively form a resonance chamber.

14. The wireless communication device of claim 13, wherein the first radiation portion is arranged in a chamber enclosed by the first housing or the second housing, the metal piece, and the hinge.

15. The wireless communication device of claim 12, wherein the first housing and the second housing are in an unfold status relative to the hinge, the first housing, the hinge, and the second housing are connected in order, resulting the wireless communication device being in a tablet mode; the first housing and the second housing correspondingly rotate to an overlapped status in a first direction relating to the hinge as a rotating axis, resulting the wireless communication device being in a phone mode; the first housing and the second housing correspondingly rotate to an overlapped status in a second direction relating to the hinge as a rotating axis, resulting the wireless communication device being in a standby mode; the first direction is opposite to the second direction.

16. The wireless communication device of claim 11, further comprising a circuit board for providing current and ground for the antenna structure.

17. The wireless communication device of claim 13, wherein the antenna structure further comprises a second radiation portion, the second radiation portion comprises a fifth radiation section, a sixth radiation section, a seventh radiation section, and an eighth radiation section connected in order; the fifth radiation section and the seventh radiation section are perpendicularly connected to two ends of the sixth radiation section and extend in opposite directions; one end of the fifth radiation section is grounded and spaced apart from the metal piece; the eighth radiation section is perpendicularly connected to an end of the seventh radiation section that away from the sixth radiation section, the eighth radiation section is parallel with the sixth radiation section, the eighth radiation section and the sixth radiation section extend in a same direction from two ends of the seventh radiation section; the eighth radiation section is parallel with and spaced apart from the hinge with a second gap; a length of the eighth radiation section is less than a length of the sixth radiation section.

18. The wireless communication device of claim 17, wherein the antenna structure further comprises a third radiation portion, the third radiation portion comprises a ninth radiation section and a tenth radiation section, an end of the ninth radiation section that away from the tenth radiation section is grounded, and spaced apart from the metal piece; the tenth radiation section is perpendicularly connected to the ninth radiation section, the tenth radiation section is parallel with and spaced apart from the hinge with a third gap; a length of the tenth radiation section is less than a length of the ninth radiation section.

* * * * *